US007680862B2

(12) United States Patent
Chong et al.

(10) Patent No.: US 7,680,862 B2
(45) Date of Patent: Mar. 16, 2010

(54) REWRITING TABLE FUNCTIONS AS SQL STRINGS

(75) Inventors: Eugene Inseok Chong, Concord, MA (US); Souripriya Das, Nashua, NH (US); George Eadon, Nashua, NH (US); Jagannathan Srinivasan, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 1299 days.

(21) Appl. No.: 11/108,242

(22) Filed: Apr. 18, 2005

(65) Prior Publication Data

US 2006/0235837 A1 Oct. 19, 2006

(51) Int. Cl.
*G06F 7/00* (2006.01)
(52) U.S. Cl. ...................................... 707/753; 707/718
(58) Field of Classification Search ................. 707/1–5, 707/100, 103 R, 203, 206, 10, 102, 104.1, 707/200, 7, 20, 204; 709/203, 222, 223, 709/224, 228, 201; 715/513, 514, 141, 530
See application file for complete search history.

(56) References Cited

U.S. PATENT DOCUMENTS 5,875,334 A * 2/1999 Chow et al. .................. 717/141
5,930,795 A * 7/1999 Chen et al. ................... 707/100
6,338,056 B1 * 1/2002 Dessloch et al. ............... 707/2
6,526,403 B1 * 2/2003 Lin et al. ......................... 707/4
6,615,203 B1 * 9/2003 Lin et al. ......................... 707/3
6,836,778 B2 * 12/2004 Manikutty et al. .......... 707/102
2005/0108209 A1 * 5/2005 Beyer et al. .................... 707/3
2005/0119988 A1 * 6/2005 Buch et al. ..................... 707/1

OTHER PUBLICATIONS

Krishnaprasad et al., Proceedings of the 30th VLDB Conference, Toronto, Canada, 2004, pp. 1134-1145.*

(Continued)

*Primary Examiner*—Cheyne D Ly
(74) *Attorney, Agent, or Firm*—Gordon E. Nelson

(57) ABSTRACT

The TABLE function mechanism available in a RDBMS is used to integrate RDF models into SQL queries. The table function invocation takes parameters including an RDF pattern, an RDF model, and an RDF rule base and returns result rows to the SQL query that contain RDF triples resulting from the application of the pattern to the triples of the model and the triples inferred by applying the rule base to the model. The RDBMS includes relational representations of the triples and the rules. Optimizations include indexes and materialized views of the representations of the triples, precomputed inferred triples, and a method associated with the TABLE function that rewrites the part of the SQL query that contains the TABLE function invocation as an equivalent SQL string. The latter technique is generally applicable to TABLE functions.

24 Claims, 20 Drawing Sheets

OTHER PUBLICATIONS

Reinwald, B.; Pirahesh, H.; Krishnamoorthy, G.; Lapis, G.; Tran, B.; Vora, S., "Heterogeneous query processing through SQL table functions," Data Engineering, 1999. Proceedings., 15th International Conference on , vol., no., pp. 366-373, 23-26 Mar 1.*

Dessloch et al., Proceedings of the 23rd VLDB Conference, Athens, Greece, 1997, pp. 528-536.*

Alexander et al., RDF Data Model in Oracle. In W3C, Workshop on Semantic Web for Life Sciences 2004. Cambridge, Massachusetts, USA, pp. 1-8.*

Gregory Karvounarakis, Sofia Alexaki, Vassilis Christophides, Dimitris Plexousakis, and Michel Scholl, "RQL: A Declarative Query Language for RDF", WWW2002, May 7-11, 2002, Honolulu, Hawaii, USA.

Libby Miller, Andy Seaborne, Alberto Reggiori, "Three Implementations of SquishQL, a Simple RDF Query Language", First International Semantic Web Conference (ISWC2002), Sardinia, Jun. 2002.

Andy Seaborne "RDQL: A Query Language for RDF", W3C Member Submission Jan. 9, 2004, http://www.w3.org/Submission/2004/SUBM-RDQL-20040109.

"RDFQL Database Command Reference", RDF Gateway, http://www.intellidimension.com/default.rsp?topic=/pages/rdfgateway/reference/db/default_rsp.

"SPARQL Query Language for RDF", W3C Working Draft, Oct. 12, 2004, http://www.w3.org/TR/2004/WD-rdf-sparql-query-20041012/.

* cited by examiner

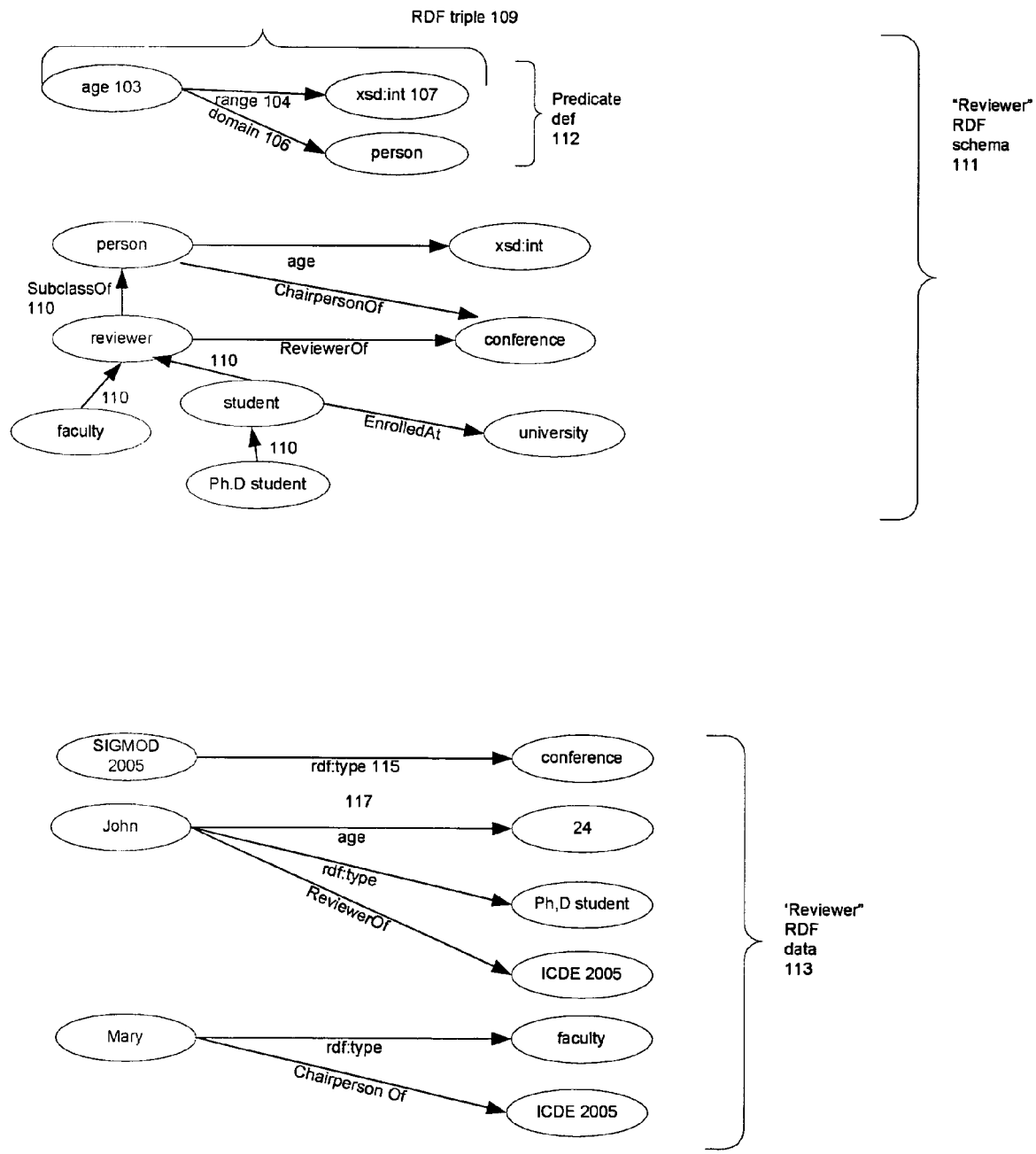
Fig. 1–Prior Art

| Schema Triples | | |
|---|---|---|
| Subject | Predicate | Object |
| Reviewer | rdfs:subClassOf | Person |
| Faculty | rdfs:subClassOf | Reviewer |
| Student | rdfs:subClassOf | Reviewer |
| Ph.D. Student | rdfs:subClassOf | Student |
| ChairpersonOf | rdfs:domain | Person |
| ChairpersonOf | rdfs:range | Conference |
| ReviewerOf | rdfs:domain | Person |
| ReviewerOf | rdfs:range | Conference |
| Age | rdfs:domain | Person |
| Age | rdfs:range | xsd:int |

201

| Data Triples | | |
|---|---|---|
| Subject | Predicate | Object |
| ICDE 2005 | rdf:type | Conference |
| John | Age | 24 |
| John | rdf:type | Ph.D.student |
| John | ReviewerOf | ICDE 2005 |
| Mary | rdf:type | Faculty |
| Mary | ChairpersonOf | ICDE 2005 |
| Mary | Age | 29 |
| Tom | Age | 22 |
| Tom | rdf:type | Ph.D.student |
| Tom | ReviewerOf | ICDE 2005 |
| Gary | Age | 23 |
| Gary | rdf:type | Ph.D.student |
| Gary | ReviewerOf | VLDB 2005 |
| Bob | Age | 21 |
| Bob | rdf:type | Ph.D.student |
| Bob | ReviewerOf | VLDB 2005 |

203

205 {
  207(1) '(?r    ReviewerOf    ?c)
  207(2) (?r    rdf:type    Ph.D.Student)
  207(3) (?r    Age    ?a)',

Fig. 2 Prior Art

303 ('rb', -- rulebase name
305 'ChairpersonRule', -- rule name
307 '(?r ChairpersonOf ?c)', -- LHS pattern
308 Null, -- filter condition
309 Null, -- ailiases
311 '(?r ReviewerOf ?c)') -- RHS pattern

} 310

RDF rule 301

'(?r ReviewerOf ?c)'

RDF pattern 312 that requires rule 301

```
                                    504
                            ┌───────┴───────┐
                    ┌──── SELECT t.r reviewer, t.c conf, t.a age
                    │     FROM TABLE (RDF_MATCH(
            ┌──── 507 ┌── '(?r rdf:type              Student)
    503  ┌ 505 ┤       │   (?r ReviewerOf            ?c)
         │    │     └── (?r Age                   ?a)',
         │    │       509 RDFModels          ('reviewers'),
         │    └─ 511 513 NULL, NULL) ) t ──────────── 512
         └──────── WHERE t.a <25;
```

RDF query 501

| Student reviewer (r) | Conf (c)  | C$typer | Age(a) | A$type  |
|----------------------|-----------|---------|--------|---------|
| John                 | ICDE 2005 | URI     | 24     | xsd:int |
| Tom                  | ICDE 2005 | URI     | 22     | xsd:int |
| Gary                 | VLDB 2005 | URI     | 23     | xsd:int |
| Bob                  | VLDB 2005 | URI     | 21     | xsd:int | rows 516 returned by RDF_Match 505

| Student reviewer (r) | Conf (c)  | Age(a) |
|----------------------|-----------|--------|
| John                 | ICDE 2005 | 24     |
| Tom                  | ICDE 2005 | 22     |
| Gary                 | VLDB 2005 | 23     |
| Bob                  | VLDB 2005 | 21     | result rows 514 returned by SELECT statement 503

```
            ┌──── SELECT t.c conf,
         518 │            COUNT(*) row_count, AVG(t.a) avg_age
    517 ┤ 505 FROM TABLE (RDF_MATCH(...) ) t
         │ 519 GROUP BY t.c
         └─ 521 ORDER BY avg_age:
```

RDF query with aggregation 515

| Conf (c)  | Count | Average |
|-----------|-------|---------|
| VLDB 2005 | 2     | 22      |
| ICDE 2005 | 2     | 23      | result rows 523 returned by SELECT statement 517

Fig. 5

IdTriples 601

| ModelId | SubjectID | PropertyID | ObjectID |
|---|---|---|---|
| ReviewersID | ICDE2005ID | Rdf:TypeID | ConferenceID |
| ReviewersID | JohnID | AgeID | 24ID |
| ReviewersID | JohnID | Rdf:TypeID | PhDStudentID |
| ReviewersID | JohnID | ReviewerOfID | ICDE2005ID |
| ... | ... | ... | ... |

611 marks the header row; 603 = ModelId, 605 = SubjectID, 607 = PropertyID, 609 = ObjectID.

index entry 629

| 24 | <num. of row 621> |
|---|---| idx_num 627

UriMap 613

| Internal ID | RDFVal | Canonical? | Literal Type |
|---|---|---|---|
| ReviewersID | "Reviewers" | y | String |
| ICDE2005ID | <ICDE2005 URI> | y | URI |
| JohnID | <John_URI> | y | URI |
| AgeID | <Age_URI> | y | URI |
| 24ID | 24 | y | int |
| ... | ... | ... | ... |

615 = Internal ID, 617 = RDFVal, 623 = Canonical?, 625 = Literal Type; 619, 620, 621 mark rows.

RDF triple tables 445

Fig. 6

```
711    CreateRulesIndex (          /* Infer & store triples for
                                      specified models & rules */
           IndexName            VARCHAR2(30)
           Models               RDFModels,
           Rulebase             RDFRuleBases);

713    DropRulesIndex (            /* Remove inferred triples for
                                      specified models & rules */
           IndexName            VARCHAR2(30));
``` rulebase indexes 1009

Fig.7

| Data Triples | | |
|---|---|---|
| Subject | Predicate | Object |
| 1 | ICDE 2005 | rdf:type | Conference |
| 2 | John | Age | 24 |
| 3 | John | rdf:type | Ph.D.student |
| 4 | John | ReviewerOF | ICDE 2005 |
| 5 | Mary | rdf:type | Faculty |
| 6 | Mary | ChairpersonOf | ICDE 2005 |
| 7 | Mary | Age | 29 |
| 8 | Tom | Age | 22 |
| 9 | Tom | rdf:type | Ph.D.student |
| 10 | Tom | ReviewerOf | ICDE 2005 |
| 11 | Gary | Age | 23 |
| 12 | Gary | rdf:type | Ph.D.student |
| 13 | Gary | ReviewerOf | VLDB 2005 |
| 14 | Bob | Age | 21 |
| 15 | Bob | rdf:type | Ph.D.student |
| 16 | Bob | ReviewerOf | VLDB 2005 |

203

Subject-subject join 903:   Row pairs: (1,1) (2,2) (2,3) (2,4) (3,2) (3,3) (3,4) (4,2) (4,3)(4,4) etc.

Subject-predicate join 905: No row pairs

Subject-object join 907:   Row pairs: (1,4) (1,6)(1,10)

two-way joins 901

Fig. 9

| Subject | Property | Object |
|---|---|---|
| John | rdf:type | Student |
| John | EnrolledAt | Univ1 |
| John | Age | 24 |
| Pam | rdf:type | Student |
| Pam | EnrolledAt | Univ2 |
| Pam | Age | 22 |
| Univ1 | City | New York |
| Univ2 | City | Los Angeles |

RDF triples 1103

| Subject | StudiesAt | Age |
|---|---|---|
| John | New York | 24 |
| Pam | Los Angeles | 22 |

Ph.D student subject-property matrix join materialized
view for an Age predicate and an inferred Studies At
predicate 1105

```
'(?r rdf:type    Student)
 (?r enrolledAt  ?u)
 (?r age         ?a)
 (?u city        ?city)'
```

RDF pattern 1107

|   | Data Triples | | |
|---|---|---|---|
|   | Subject | Predicate | Object |
| 1 | ICDE 2005 | rdf:type | Conference |
| 2 | John | Age | 24 |
| 3 | John | rdf:type | Ph.D.student |
| 4 | John | ReviewerOF | ICDE 2005 |
| 5 | Mary | rdf:type | Faculty |
| 6 | Mary | ChairpersonOf | ICDE 2005 |
| 7 | Mary | Age | 29 |
| 8 | Tom | Age | 22 |
| 9 | Tom | rdf:type | Ph.D.student |
| 10 | Tom | ReviewerOf | ICDE 2005 |
| 11 | Gary | Age | 23 |
| 12 | Gary | rdf:type | Ph.D.student |
| 13 | Gary | ReviewerOf | VLDB 2005 |
| 14 | Bob | Age | 21 |
| 15 | Bob | rdf:type | Ph.D.student |
| 16 | Bob | ReviewerOf | VLDB 2005 |

Rownums 1203

203

| Predicate | Subject | Object | Rownum |
|---|---|---|---|
| Age | John | 24 | 2 |
| Age | Mary | 29 | 7 |
| Age | Tom | 22 | 8 |
| Age | Gary | 23 | 11 |
| Age | Bob | 21 | 14 |
| ChairpersonOf | Mary | ICDE 2005 | 6 |
| rdf:type | John | Ph.D. Student | 3 |
| rdf:type | Mary | Faculty | 5 |
| rdf:type | Tom | Ph.D. Student | 9 |
| rdf:type | Gary | Ph.D. Student | 12 |
| rdf:type | Bob | Student | 15 |
| rdf:type | ICDE 2005 | Conference | 1 |
| ReviewerOf | John | ICDE 2005 | 4 |
| ReviewerOf | Tom | ICDE 2005 | 10 |
| ReviewerOf | Gary | VLDB 2005 | 13 |
| ReviewerOf | Bob | VLDB 2005 | 16 |

1207 1209 1211 1213

1215

Predicate-subject-object index 1205

```
'(?r      ReviewerOf      ?c)
 (?r      Age             ?a)'
```
1303

```
'(?r      ReviewerOf      ?c)
 (?c      rdf:type        Conference)'
```
1305

```
       ⎧         SELECT t.a age
       ⎪      ⎧  FROM TABLE(RDF_MATCH(
       ⎪      ⎪        ⎧ '(?r age ?a)'
1501  ⎨ 1503 ⎨  1505 ⎨  RDFModels('reviewers'),
       ⎪      ⎪        ⎩ NULL,
       ⎪      ⎪          NULL)) t
       ⎪      ⎩  WHERE t.a < 25
       ⎩
```

```
        ⎧ SELECT u1.UriValue a
        ⎪ FROM IdTriples t1, UriMap u1
1507  ⎨  WHERE t1.PropertyID = 29 AND
        ⎪        u1.UriID = t1.SubjectID
        ⎩
```

```
       ⎧        SELECT t.a age
       ⎪     ⎧  FROM (SELECT u1.UriValue a
       ⎪     ⎪         FROM IdTriples t1, UriMap u1
1509  ⎨ 1507⎨         WHERE t1.PropertyID = 29 AND
       ⎪     ⎪                u1.UriID = t1.SubjectID) t
       ⎪     ⎩  WHERE t.a < 25
       ⎩
```

Fig. 15

| | 1703 | 1705 |
|---|---|---|
| | RulebaseName | RuleName |
| 1707 | <unique rule base name> | <unique rule name> |
| | . . . | . . . | rulebase table 1701

| | 1711 | 1713 | 1715 | 1717 |
|---|---|---|---|---|
| | RuleName | LeftPattern | Filter | RightPattern |
| 1719 | <unique rule name> | <pattern string> | <filter string> | <pattern string> |
| | . . . | . . . | . . . | . . . | rule table 1709

RDF rule tables 449

Fig. 17

```
1803    CreateRulebase    (    /* Create a Rulebase */
                 RulebaseName     VARCHAR2 (30));

1805    DropRulebase      (    /* Delete a Rulebase */
                 RulebaseName     VARCHAR2 (30));

1807    InsertRuleIntoRulebase   (/* Add a rule to a RB */
                 RuleName             VARCHAR2 (30),
                 RulebaseName         VARCHAR2 (30));

1809    DeleteRuleFromRulebase   (/* Drop a rule from a RB */
                 RuleName             VARCHAR2 (30),
                 RuleBaseName         VARCHAR2 (30));

1811    CreateRule    (          /* Create a Rule */
                 Rulename         VARCHAR2 (30),
                 LeftPattern      RDFPattern,
                 Filter           CLOB,
                 RightPattern     RDFPattern
                 Aliases          RDFAliases);

1813    DropRule    (            /* Delete a Rule */
                 RuleName         VARCHAR2 (30));
```

Rulebase API 1801

Fig. 18

```
1903    RDFMViewCardinalities (
                Models      RDFModels,
                Rulebases   RDFRuleBases);

1905    RDFMviewCreate (    /* Create a materialized join view based on JoinColumns */
                MviewName   VARCHAR2(4000),
                Models      RDFModels,
                Rulebases   RDFRuleBases,
                JoinColumns VARCHAR2(2)));  /* Values:  'SS', 'SO', 'SP', 'PP', 'OO' */

1907    RDFMviewDrop ( /* Delete a materialized view */
                MviewName       VARCHAR2(4000));

1909    RDFMatrixCreateMView ( /* Create a subject-property Matrix Mview */
                MviewName   VARCHAR2(4000),
                Models      RDFModels,
                Rulebases   RDFRuleBases,
                Pattern     RDFPattern,
                Filter      CLOB);
```

Materialized view API
1901

Fig. 19

```
2003  ⎧ SELECT * FROM TABLE ( tab_func('emp', 'dept' , 'dept_id')) t
      ⎩ WHERE t.emp_name LIKE 'p%';

⎧ SELECT e.name emp_name, d.dname dept_name
2005  ⎨ FROM employee e, department d
      ⎩ WHERE   e.dept_id = d.dept_id;

⎧ SELECT * FROM ( ⎧ SELECT e.name emp_name, d.dname dept_name
2007  ⎨            2005 ⎨ FROM employee e, department d
      ⎨                 ⎩ WHERE   e.dept_id = d.dept_id) t
      ⎩ WHERE t.emp_name LIKE 'p%';

2001

2011  ⎧ CREATE VIEW summaries
      ⎩ USING sum_tab_function(fact_table VARCHR,
                 2012           time_granularity VARCHAR);

2013   2016
2015  ⎰ SELECT * FROM summaries('sales', 'year');
                                    2014

2017  ⎰ SELECT SUM(amount)  sum_amount FROM sales
      ⎱ GROUP BY year;

2019  ⎰ SELECT * FROM (SELECT SUM(amount)  sum_amount FROM sales
                       GROUP BY year);
      2009                        2017
```

Fig. 20

REWRITING TABLE FUNCTIONS AS SQL STRINGS

CROSS REFERENCES TO RELATED PATENT APPLICATIONS

The subject matter of this patent application is closely related to the subject matter of patent application U.S. Ser. No. 11/108,204, Chong, et al., Integrating RDF data into a relational database system, which has the same inventors and assignee as the present patent application and is being filed on even date with this application. U.S. Ser. No. 11/108,204 is further incorporated by reference into this patent application for all purposes.

BACKGROUND OF THE INVENTION

1. Field of the Invention

The invention concerns the representation of semantic knowledge by the Resource Description Framework, or RDF, and more specifically concerns the integration of data represented by RDF into a relational database system.

2. Description of Related Art: FIGS. 1-3

RDF is a language that was originally developed for representing information (metadata) about resources in the World Wide Web. It may, however, be used for representing information about absolutely anything. When information has been specified using the generic RDF format, it may be automatically consumed by a diverse set of applications.

FIGS. 1-3 provide an overview of RDF. Facts in RDF are represented by RDF triples. Each RDF triple represents a fact and is made up of three parts, a subject, a predicate, (sometimes termed a property), and an object. For example, the fact represented by the English sentence "John is 24 years old" is represented in RDF by the subject, predicate, object triple <'John', 'age', '24'>, with 'John' being the subject, 'age' being the predicate, and '24' being the object. In current RDF, the values of subjects and predicates must ultimately resolve to universal resource identifiers (URIs). The values of objects may be literal values such as numbers or character strings. The interpretations given to the members of the triple are determined by the application that is consuming it. RDF triples may be represented as a graph as shown at 109 in FIG. 1. The subject is represented by a node 103, the object by another node 107, and the predicate by arrow 104 connecting the subject node to the object node. A subject may of course be related to more than one object, as shown with regard to "Person" 103. Each entity in an RDF triple is represented by a World Wide Web Uniform Resource Identifier (URI) or a literal value. For example, the subject "John" is identified by the URI for his contact information. In RDF triple 117, the value of John's age is the literal value 24. In the following general discussion of RDF, the URIs will be replaced by the names of the entities they represent. For a complete description of RDF, see Frank Manola and Eric Miller, *RDF Primer*, published by W3C and available in September, 2004 at www.w3.org/TR/rdf-primer/. The *RDF Primer* is hereby incorporated by reference into the present patent application.

An RDF representation of a set of facts is termed in the following an RDF model. A simple RDF model Reviewers is shown at 101 in FIG. 1. The model has two parts: RDF data 113 and RDF schema 111. RDF schema 111 is made up of RDF triples that provide the definitions needed to interpret the triples of RDF data 113. Schema triples define classes of entities and predicates which relate classes of entities. A property definition for the predicate age is shown at 112. As shown there, a predicate definition consists of two RDF triples for which the predicate is the subject. One of the triples, which has the built-in domain predicate, indicates what kind of entities must be subjects for the predicate. Here, it is entities belonging to the class person. The other triple indicates what kinds of entities must be objects of the predicate; here, it is values of an integer type called xsd:int. Schema 111 uses the SubclassOf predicate 110 to define a number of subclasses of entities belonging to the class person. Also defined are conference and university classes of entities, together with predicates that relate these entities to each other. Thus, an entity of class person may be a chairperson of a conference and an entity of class reviewer may be a reviewer for a conference. Also belonging to Schema 111 but not shown there is the built-in RDF predicate rdf:type. This predicate defines the subject of a triple that includes the rdf:type predicate as an instance of the class indicated by the object. As will be explained in more detail, RDF rules determine logical relationships between classes. For example, a built-in RDF rule states that the SubclassOf relationship is transitive: if A is a subclass of B and B a subclass of C, then A is a subclass of C. Thus, the class faculty is a subclass of person.

The data triples to which schema 111 applies are shown at 113; they have the general pattern <individual entity>, <predicate>, <object characterizing the individual entity>. Thus, triple 115 indicates that ICDE 2005 is an entity characterized as belonging to the class CONFERENCE and triple 117 indicates that JOHN is characterized by having the age 24. Thus, RDF data 113 contains the following triples about John:

John has an Age of 24;

John belongs to the subclass Ph. D. Student;

John is a ReviewerOf ICDE 2005.

None of these triples states that John is a Person; however, the fact that he is a Person and a Reviewer is inferred from the fact that he is stated to be a Ph. D. Student, which is defined in schema 111 as a subclass of both Person and Reviewer. Because the Subclassof predicate is transitive, the fact that John is a Ph.D Student means that he is a potential subject of the Age and ReviewerOf properties.

For purposes of the present discussion RDF models are best represented as lists of RDF triples instead of graphs. FIG. 2 shows a table of triples 201 which lists triples making up schema 111 and a table of triples 203 which lists triples making up RDF data 113. At the bottom of FIG. 2 is an RDF Pattern 205. An RDF pattern is a construct which is used to query RDF triples. There are many different ways of expressing RDF patterns; what follows is a typical example. When RDF pattern 205 is applied to RDF model 101, it will return a subgraph of RDF model 101 which includes all of the reviewers of conference papers who are Ph.D students. The pattern is made up of one or more patterns 207 for RDF triples followed by an optional filter which further restricts the RDF triples identified by the pattern. The identifiers beginning with ? are variables that represent values in the triples belonging to the subgraph specified by the RDF pattern. Thus, the first pattern 207(1) specifies every Reviewer for every Conference indicated in the RDF data 203; the second pattern 207(2) specifies every Reviewer who belongs to the subclass Ph.D.Student, and the third pattern 207(3) specifies every Person for which an Age is specified. The result of the application of these three patterns to RDF data 203 is the intersection of the sets of persons specified by each of the patterns, that is, the intersection of the set of reviewers and the set of Ph.D. Students of any age. The intersection is John, Tom, Gary, and Bob, who are indicated by the triples in data 203 as being both Ph.D students and reviewers.

The manner in which entities in an RDF model relate to each other can be modified by applying RDF rules. An example RDF rule is shown at 301 in FIG. 3. Rule 301 is contained in a rulebase which, as shown at 303, has the name rb. The rule has a name, chairpersonRule, which is shown at 305. As will be explained in detail later, the rule specifies how the class of Persons who are conference chairpersons relates to the class of Reviewers for the conference. Rule body 310 has a left-hand side 307 specifying the rule's antecedent and a right-hand side 311 specifying the rule's consequent. The rule states that if an entity satisfies the conditions established for the left-hand side 307 (the antecedent), it also satisfies the conditions established for the right-hand side 311 (the consequent). The antecedent and the consequent are specified by RDF patterns. The RDF pattern for left-hand side 307 specifies any Person (?r) in the model who is a chairperson of any Conference (?c) in the model; the RDF pattern for right-hand side 311 specifies that any such person is also a reviewer for that conference.

RDF pattern 312 shows the effect of rule 301. The pattern's triple specifies RDF triples which have the ReviewerOf predicate. Without rule 301, the pattern returns the subjects of those triples for ?r, or John, Tom, Gary, and Bob. The problem with this is that Mary is also a reviewer by virtue of rule 301; consequently, when the rule is taken into account, the triples include not only those with the ReviewerOf predicate, but those that have the ChairpersonOf predicate, and that adds Mary to the list of subjects for ?r. An RDF model 101 and the rules and other information required to interpret the model are termed together in the following an RDF dataset Components of an RDF data set are shown at 313 in FIG. 3. The components include RDF model 101, with its schema 111 and RDF data 113, one or more optional rulebases containing rules relevant to the model, and a list of optional aliases 323, which relate names used in the model to longer designations.

The rulebases include an RDFS rulebase 319 which is a set of rules which apply to all RDF models. An example of the rules in this rulebase is the rule that states that an entity which belongs to a subclass of a class also belongs to the class, for example, that as a member of the class Ph.D.Student, John is also a member of the class Person. In addition, rules may be defined for a particular RDF model. Rule 301 is an example of such a rule. These rules are contained in one or more other rule bases 321. Aliases 323 relates short names used in a model to the URIs that completely identify the short name. For example, John, Mary, Tom, Gary, and Bob are all subjects and must therefore be identified by URIs. Aliases 323 will include a table that relates each name to its corresponding URI.

Systems for Querying RDF Models

A number of query languages have been developed for querying RDF models. Among them are:

RDQL, see RDQL—A Query Language for RDF, W3C Member Submission 9 Jan. 2004, http://www.w3.org/Submission/2004/SUBM-RDQL-20040109;

RDFQL, see RDFQL Database Command Reference, http://www.intellidimension.com/default.rsp?topic=/pages/rdfgateway/reference/db/default.rsp;

RQL, see G. Karvounarakis, S. Alexaki, V. Christophides, D. Plexousakis, M. Scholl. RQL: A Declarative Query Language for RDF. WWW2002, May 7-11, 2002, Honolulu, Hi., USA.

SPARQL, see SPARQL Query Language for RDF, W3C Working Draft, 12 Oct. 2004, http://www.w3.org/TR/2004/WD-rdf-sparql-query-20041012/.

SquishQL, see RDF Primer. W3C Recommendation, 10 Feb. 2004, http://www.w3.org/TR/rdf-primer.

The query languages described in the above references are declarative query languages with quite a few similarities to SQL, which is the query language used in standard relational database management systems. Indeed, systems using these query languages are typically implemented on top of relational database systems. However, because these systems are not standard relational database systems, they cannot take advantage of the decades of engineering that have been invested in the standard relational database systems. Examples of the fruits of this engineering that are available in standard relational database systems are automatic optimization, facilities for the creation and automatic maintenance of materialized views and of indexes, and the automatic use of available materialized views and indexes by the optimizer. What is needed if RDF triples are to reach their full potential are a technique for using RDF patterns to query sets of RDF triples that may be employed in a standard relational data base management system and techniques for using the facilities of the relational database management system to reduce the cost in processing time of queries on sets of RDF triples.

The techniques used to integrate RDF data into a relational database system involve the use of a TABLE function. Consequently, a large part of the cost in processing time of queries on sets of RDF triples is the time required to set up the execution of the TABLE function, execute the TABLE function, and then transfer data from the TABLE function to the SQL query that contains the TABLE function. It is thus an object of the present invention to reduce the cost of execution of table functions.

SUMMARY OF THE INVENTION

The foregoing object of the invention is attained by associating a rewrite method with the table function. The result rows returned by the table function are represented in an SQL statement by a container for the table function. The rewrite method returns an SQL string that when executed returns a set of result rows that are equivalent to the result rows returned when the table function is executed. The relational database management system executes the rewrite method to obtain the SQL string prior to executing the SQL query that contains the TABLE function and replaces the container for the table function by the returned SQL string. Since the returned SQL string is simply part of the SQL query, it has none of the overhead of the required to set up the table function for execution, execute it, and transfer the data from the TABLE function to the SQL query. A further advantage is that the relational database management system's optimizer can operate on the rewritten SQL query.

In other aspects of the invention, the table function has a parameter that the rewrite method uses in producing the returned SQL string. The rewrite method determines from the parameter whether it is possible to produce the SQL string and provides and indication to the relational database management system when that is not possible. The relational database management system responds to the indication by not rewriting the SQL statement.

There may also be a runtime execution method associated with the TABLE function in addition to the rewrite method and the rewrite method may be optional. When there is no rewrite method, the relational database management system executes the runtime execution method. The methods may be provided by the relational database management system or by a user of the relational database management system. The container for the TABLE function may be a TABLE clause or a parameterized view that is defined using the table function. Other objects and advantages will be apparent to those skilled in the arts to which the invention pertains upon perusal of the following Detailed Description and drawing, wherein:

BRIEF DESCRIPTION OF THE DRAWING

FIG. 1 shows RDF triples represented as graphs;
FIG. 2 shows tables of RDF triples and an RDF pattern;
FIG. 5 shows an SQL query that contains an RDF_MATCH table function;
FIG. 6 shows RDF triple tables 445 in a preferred embodiment;
FIG. 7 is an illustration of an inferred triple index and the API for manipulating such indexes;
FIG. 9 is an illustration of self joins;
FIG. 11 is an illustration of a subject-property matrix join materialized view;
FIG. 12 is an illustration of a predicate, subject, object index;
FIG. 13 shows RDF patterns used to determine the efficiency of various kinds of indexes;
FIG. 15 is an example of rewriting;
FIG. 17 shows RDF rule tables 449 in a preferred environment;
FIG. 18 shows the API for manipulating rulebases in a preferred environment;
FIG. 19 shows the API for manipulating materialized views in a preferred environment;
and
FIG. 20 shows further examples of the use of ODCITableRewrite.

Figure 3:
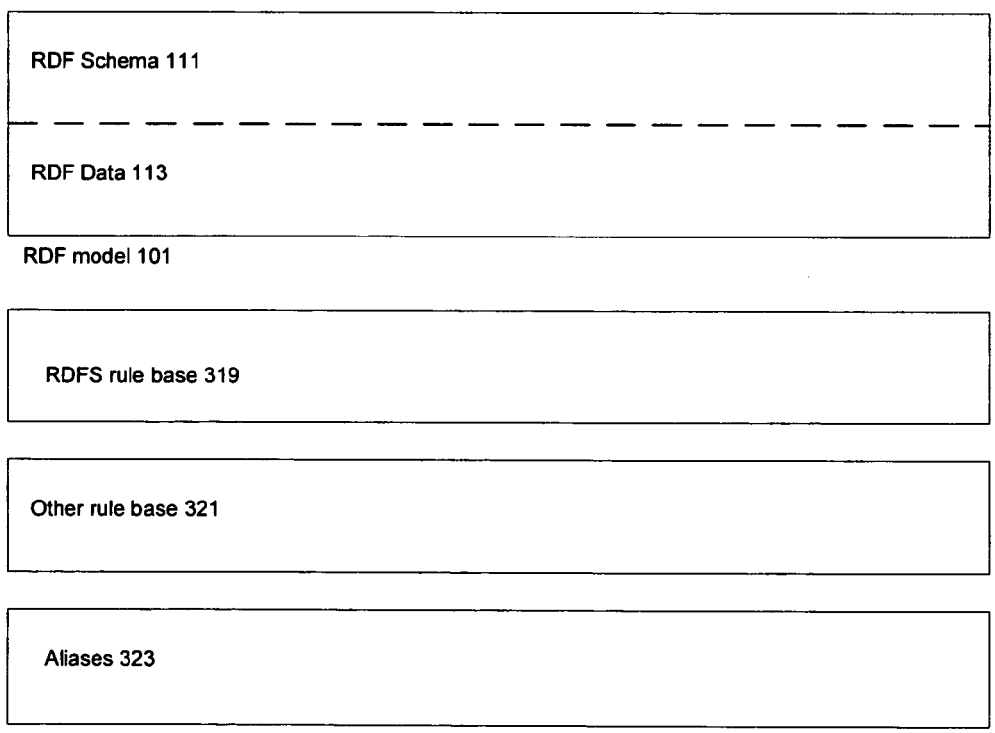
FIG. 3 shows an RDF rule and RDF information.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed description will first present an overview of the invention as embodied in a standard relational database management system (RDBMS) and will then present details of a preferred embodiment.

Overview of the Invention

Figure 4:
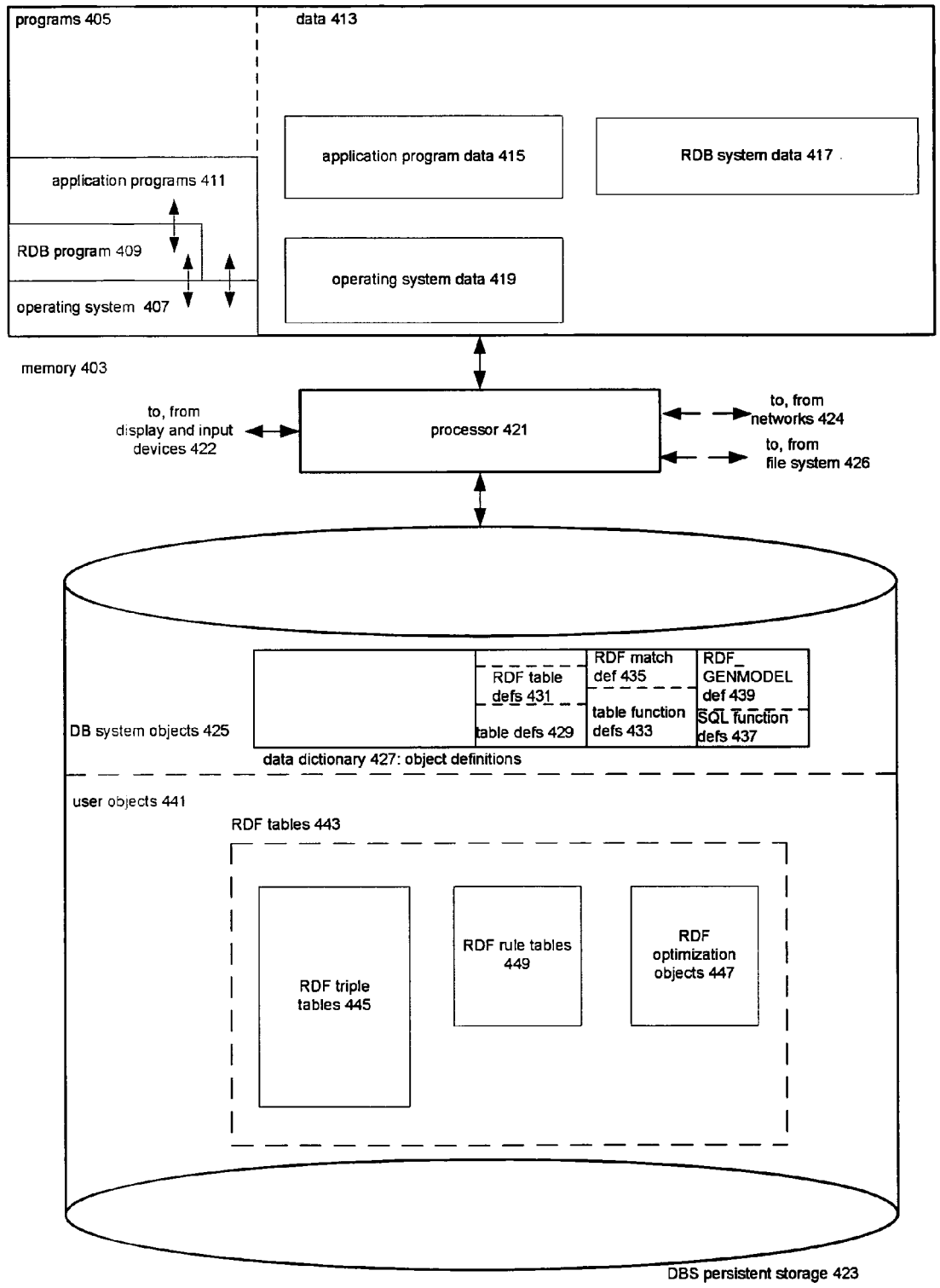
FIG. 4 provides an overview of a relational database management system in which the invention is implemented.

Overview of a RDBMS in Which the Invention is Implemented: FIG. 4

FIG. 4 is a functional block diagram of a relational database management system 401 in which the invention is implemented. RDBMS's are characterized by the fact that the information they contain is organized into tables having rows and named columns. A row of data establishes a relationship between the items of data in the row and the SQL query language uses the relationships thus established to locate information in the tables. RDBMS system 401 may be any relational database system which employs a variant of the SQL language that includes table functions. As will be explained in more detail in the following, a table function is a function which permits the RDBMS system to treat a collection of data that is obtained by the function as a table.

The main components of RDBMS system 401 are a processor 421, memory 403, which contains data and programs accessible to the processor, and persistent storage 423, which contains the information organized by system 401. Processor 421 further can provide information to and receive information from display and input devices 422, can provide information to and receive information from networks 424, and can provide information to and receive information from file system 426. RDBMS system 401 is created by processor 421 as it executes programs in memory 403 using data contained in memory. The programs typically include an operating system 407, which manages the resources used by RDBMS 401, relational database program 409, which interprets the SQL language, and application programs 411, which provide queries to RDB program 409. Data used by these programs includes operating system data 419, used by the operating system RDBMS data 417, used by RDB program 409, and application program data 415, used by application programs 411.

The information which RDB program 409 maintains in persistent storage 423 is stored as objects that RDBMS system 401 is able to manipulate. Among the objects are fields, rows, and columns in the tables, the tables themselves, indexes to the tables, and functions written in the SQL language. The objects fall into two broad classes: user-defined objects 441, which are defined by users of the RDBMS, and system-defined objects 425, which are defined by the system. RDBMS 401 maintains definitions of all of the objects in the database system in data dictionary 427, which is part of DB system objects 425. For the present discussion, the most important definitions in data dictionary 427 are table definitions 429, which include definitions 431 of RDF tables 443, table function definitions 433, which define table functions including RDF_MATCH table function 435, which permits use of RDF patterns to query RDF models in RDBMS 401, and SQL function definitions 437, which includes RDF_GENMODEL function 439, which takes RDF triples and makes them into RDF tables 443.

The tables of interest in user objects 441 are RDF tables 443, which are tables in RDBMS 401 that are made from the information contained in RDF information 313. These tables fall into three groups: RDF triple tables 445, which represent the triples making up an RDF model 101, RDF rule tables 449, which contain the rule bases belonging to RDF information 313, and RDF optimization objects 447, which are tables and other objects which are used to speed up queries on the RDF models represented by RDF triple tables 445 and the RDF rules in rules tables 449. All of these tables and objects will be explained in more detail below.

Overview of the Operation of the Invention: FIG. 5

The invention integrates RDF into SQL by means of a set of tables 445 and 449 in user objects 441 that represent RDF data sets and a table function RDF_MATCH that takes a specification of an RDF data set and an RDF pattern as parameters and returns a set of result rows of triples from the RDF data set that match the RDF pattern. The solution of the RDF pattern may include inferencing based on RDFS and user-defined rules. The signature of RDF_MATCH is as follows:

RDF_MATCH (
    Pattern           VARCHAR,
    Models           RDFModels,

-continued

```
        RuleBases          RDFRules,
        Aliases            RDFAliases,
)
        RETURNS AnyDataSet;
```

The first parameter is one or more character strings that indicate the RDF pattern to be used for the query. Typically, the character string will consist of one or more <Subject, Property, Object> triple patterns. The remaining parameters specify the RDF data set to be queried. Models specifies the data set's RDF models, RuleBases specifies rule bases that contain the RDF rules that apply to the models, and Aliases specify any aliases that apply to the RDF data set. As is true with any table function, RDF_MATCH returns a set of result rows. Each result row represents a triple consisting of a set of values (bindings) for the variables used in the pattern. Substitution of the variables in the pattern with the corresponding values will result in an RDF graph that is a subgraph of the graph represented by the RDF dataset (including rulebases) against which the query has been posed.

It should be noted that the contents of the result rows returned by RDF_MATCH will depend on the RDF pattern used in the query and the RDF data against which the query is run. For this reason, the return type for RDF_MATCH has been defined as AnyDataSet, which is a collection of tuples of a generic type called AnyData. When an SQL query employs the RDF_MATCH table function, components of the query such as its SELECT, WHERE, ORDER BY, etc., clauses can reference the variables present in the RDF pattern simply by the variable names.

FIG. 5 shows an example RDF query using the RDF_MATCH table function at 501. Query 501 returns information from RDF model 101 about student reviewers who are less than 25 years old. The query employs an SQL SELECT statement 503. In very general terms, a SELECT statement selects field values from one or more database tables into result rows produced by the SELECT statement. A filter in the SELECT statement may determine what result rows are selected and the SELECT statement may also specify operations to be performed on the result rows. When the SELECT statement includes a table function 505, the table function provides the data for the result rows.

Continuing in more detail, the SELECT statement specifies at 512 that the result rows will be selected from a table t which is provided by the table function. At 504 is specified the relationship between the columns t.r, t.c, and t.a of table t and the variables ?r, ?c, and ?a of RDF pattern 507. Thus, in each record of table t, a field for the t.r column will contain a value of ?r, and so on for the other fields. At 505, the SELECT statement specifies that the rows will be provided by the RDF_MATCH table function. In the following, the query that contains a table function will be called the containing query for the table function.

The parameters of RDF_MATCH table function 505 include the RDF pattern 507 which will be used to select information from RDF model 101. In conjunction with the relationship specified at 504, the pattern assigns the person selected for each row of t to the t.r column, the conference selected for each row of t to the t.c column and the person's age to the t.a column. As required by RDF pattern 507, the persons who will have rows in table t will be persons who are students and reviewers for any of the conferences indicated in RDF model 101. The remaining parameters are the following:

RDFMODELS 509 specifies the RDF model the query is being applied to.

NULL 511 that no rule base is to be included;

NULL 513 indicates that no aliases are involved.

When SELECT statement 503 executes on RDF data triples 203, RDF_MATCH 505 returns rows 516 which contain the information from the ?r, ?c, and ?a fields belonging to the RDF triples that match RDF pattern 507. In this case, there is a row for each student reviewer-conference combination and each of the rows contains the student's age. In addition to the values for the RDF pattern's variables, the result rows indicate the types of the object variables. That is necessary because objects may have either URI values or literal values. Thus, ?c specifies conferences, which are specified by URI, so the result rows include the column c$type, which indicates that the type of values of c is URI. In the case of a, the values are integer literal values, and a$type indicates that fact.

SELECT statement 503 then selects fields belonging to the columns r, c, and a of rows 515 to produce result rows 514. The WHERE clause of SELECT statement 503, finally, limits the result rows produced by the execution of the SELECT statement to ones in which the age of the people selected by pattern 507 is less than 25. In this case, the WHERE clause has no effect, since all of the student reviewers are under 25. It should be noted here that because the RDF schema also consists of RDF triples, RDF_MATCH can also be used to query an RDF schema, for example, to obtain the domains and ranges for a property.

An advantage of using the RDF_MATCH table function in a SELECT statement to query RDF data is that any SQL construct that can be used with a SELECT statement can be used to further process the result rows 516 returned by RDF_match. These constructs include iterating over the result rows, aggregating values contained in the result rows, constraining the result rows using WHERE clause predicates, sorting the result rows using ORDER BY clauses, and limiting the result rows by using the ROWNUM clause. Also, the SQL set operations can be used to combine result sets of two or more invocations of RDF_MATCH. Support for OPTIONAL matching (as described in the SPARQL reference) can be provided using the OUTER JOIN operation in SQL.

An example of how the SQL COUNT and AVG constructs might be used in a SELECT statement that contains table function 505 is shown at 515. Query 515 specified by SELECT statement 517 uses the same FROM TABLE clause 507 as query 501 and consequently the same RDF model and the same RDF pattern, but the query returns a set of result rows that specify for each conference, the number of student reviewers for the conference and the average age for the conference. The returned result rows are shown at 523. Result rows 523 are made from information in the rows returned by RDF pattern 507. These rows are shown at 514. As specified at 518, the result rows contain three fields, one indicating the conference, one indicating the number of student reviewers, and one indicating the average age of the student reviewers. There are two rows, one for each conference. The number of student reviewers is computed using the COUNT function, which counts the number of rows for each conference in the rows returned by the RDF pattern and their average age is computed by the AVG function. The GROUP BY clause specifies that the results in result rows 523 are grouped by conference and the ORDER clause specifies that the results are ordered by the average age of the student reviewers.

Figure 8:
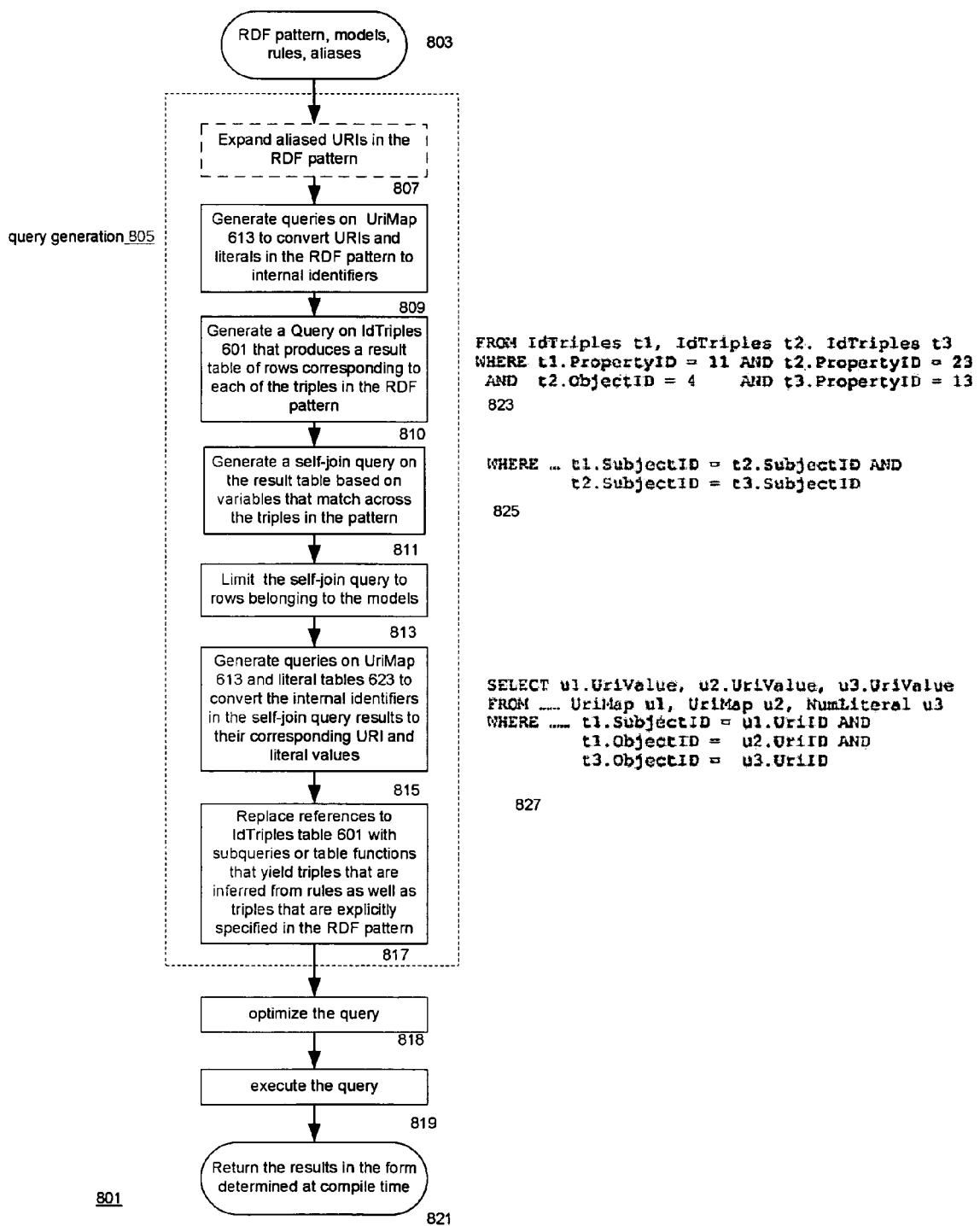
FIG. 8 is a flowchart of the operation of the RDF_MATCH table function.

A Preferred Embodiment of RDF_Match: FIGS. 6-8

The following discussion of a presently-preferred embodiment of RDF_MATCH will begin with a an overview of how table functions are implemented, will disclose details of RDF triples tables 445 in a preferred embodiment, will then provide a detailed disclosure of RDF_MATCH's operation, and will finally discuss optimizations. The preferred embodiment is implemented using a relational database management system manufactured by Oracle Corporation, Redwood City, Calif. A table function like RDF_MATCH can, however be implemented in any RDBMS that supports table functions. The optimizations may be implemented in any RDBMS that supports materialized join views and indexes. Details of the implementation of table functions used in the preferred embodiment may be found in *Data Cartridge Developer's Guide Release* 2 (9.2), Part No. A96595-01, Oracle Corporation, March 2002, which is hereby incorporated by reference into the present patent application.

Implementation of Table Functions

Oracle relational database management systems provide users of the system with a standard interface for defining and implementing a table function. The interface includes three methods:

OCDITableStart, which does whatever initialization is required before the table function can return data;

OCDITableFetch, which performs whatever action is necessary to fetch the data returned by the table function; and OCDITableClose, which does whatever cleanup is necessary after the table function has ceased returning data.

A user who is defining a table function must provide an implementation for each of these methods. RDF_MATCH is a built-in table function and implementations of the methods are provided by Oracle Corporation.

RDF Triples Tables 445: FIG. 6

FIG. 6 shows the RDF triples tables 445 in which the data for an RDF model 202 is stored after normalization. There are two main tables: IdTriples 601, which is a list of models and their RDF triples, as represented by internal identifiers for the URIs and literals making up the triple, and UriMap 613, which maps URIs and literals to the internal identifiers and thus permits conversions between the URIs and literals and the internal identifiers. This arrangement saves storage space and increases efficiency by permitting the URIs, which are often lengthy, and the literals, which are also often lengthy and may further have a variety of types, to be replaced in IdTriples table 601 by internal identifiers having a single type and size.

Continuing in detail with IdTriples table 601, this table has a row 611 for every RDF triple in the RDF models that have been loaded into RDBMS 401 on which the RDF_MATCH function is being executed. The table has four columns:

ModelID 603, which contains the internal identifier of the model to which the RDF triple belongs;

SubjectID 605, which contains the internal identifier for the RDF triple's subject;

PropertyID 607, which contains the internal identifier for the RDF triple's predicate; and ObjectID 609, which contains the internal identifier of the RDF triple's object.

As shown in FIG. 6, IdTriples table 601 shows the rows for the first four data triples of data triples 203. It would of course contain a row for every schema triple in table 201 and every data triple in table 203.

UriMap table 613 has a single row 619 for every internal identifier which appears in IdTriples table 601. There are four columns that are of interest in the present context:

InternalID 615, which contains the internal ID; and

RDFVal 617, which specifies a URI or literal value corresponding to the internal ID;

a flag which indicates whether the value of RDFval 617 is the canonical form for the value;

the type of RDFVal 617.

Types include URIs, strings, and integers.

The canonical form for a value is a standard form for writing the value. For example, the numeric value 24 may be written as 024, 24.00, $2.4 \times 10^1$, and so on. Depending on the application, any of these may be a canonical form. In a preferred embodiment, the form the value has when the first entry is made for the value in UriMap 613 is treated as the canonical value. There is further an index, idx_num 627, that indexes a given numerical value to a row in UriMap 613 that contains the canonical representation RDF Rules Tables 449: FIGS. 17 and 18

The RDF rules that apply to an RDF model 101 are stored in RDF rules tables 449. There are two such tables: rulebase table 1701, which relates rules to the rule bases they belong to, and rule table 1709, which includes an entry for each RDF rule that has been input to system 401. Beginning with rule table 1709, the table has a row 1719 for each rule. Each row contains the rule's name in column 1711, the rule's left-hand RDF pattern in column 1713, a filter, which may be null, in column 1715, and the rule's right-hand RDF pattern in column 1717. The rule's name must be unique in table 1709. Rulebase table 1701 has a row 1707 for each rule that belongs to each rulebase that has been input to system 401. Column 1703 contains the name of a rulebase and column 1705 contains the name of a rule that belongs to that rulebase. The name of the rule in field 1703 is the rule's name from field 1711. As is apparent from this arrangement, a given rule may be part of many different rulebases.

Like models, rulebases may be received as XML files; in such a situation, entries for the rules are added to rule table 1709 and entries for the rules and rulebases to rulebase table 1701. There is further an application programmer's interface (API) for creating rulebases, deleting rulebases, and incorporating rulebases in other rulebases. FIG. 18 provides an overview of this rulebase API 1801. At 1803 and 1805 are shown the functions for creating and dropping rulebases; they take the name of the rulebase being created or dropped as parameters. The functions at 1807 and 1809 permit rules to be inserted into and deleted from a rulebase; the parameters are the name of the rulebase and the name of the rule.

The interface for creating a rule is shown at 1811; the result of its execution is a new entry in rule table 1709. The interface for dropping a rule from a rulebase is shown at 1813; the result of its execution is the removal of the entry for the specified rulebase and rule from rulebase table 1701.

Details of the Operation of RDF_MATCH: FIG. 8

There are two stages in the operation of RDF_MATCH table function 435. The first stage occurs when RDBMS system 401 compiles the SELECT statement containing table function 435; the second stage occurs when the SELECT statement is executed.

Compile-Time Determination of the Form of the Rows to be Returned by RDF_MATCH:

When the SELECT statement is compiled, it can be determined which columns of the result rows returned by REF_MATCH will be actually required for the result rows returned by the SELECT statement. The results of this determination are provided to RDF_MATCH, which can use it to optimize the queries it makes on RDF triples tables 445.

Execution Time Generation of the Query Performed by the RDF_MATCH Table Function: FIG. 8

At execution time, the RDF_MATCH table function uses the information in the RDF pattern contained in the table function to generate a query on RDF triple tables 445 that obtains result rows that have the form specified in the containing SELECT statement and the values specified by the variables in the RDF pattern. The query generated by RDF_MATCH will be termed in the following the generated query. In overview, the generated query includes the following:

- a subquery on UriMap 613 to convert the values of literals and URIs specified in the RDF pattern to their corresponding internal IDs.
- a subquery on IdTriples table 601 that uses the internal IDs to find the triples that satisfy pattern 507.
- another subquery on UriMap 613 converts the internal IDs in the results of the subquery on IdTriples table 601 to their corresponding URI and literal values.

The corresponding URI and literal values are then output as specified at 504 in the SELECT statement. The subquery on IdTriples table 601 involves self joins. A join is a query that combines rows from two or more tables. In a self join, the rows that are combined are from the same table.

FIG. 8 is a flowchart 801 which provides more detail of how RDF_MATCH generates and executes the query on RDF triple tables 445. In the preferred embodiment, the query is generated by the ODCITableStart method and executed by the OCDITableFetch method. At 803 is shown the call to the method, with the method's parameters of an RDF pattern, one or more RDF models, at least the RDFS rules, and in some cases, aliases. Query generation is shown at 805. The first step is to expand aliased URIs in the RDF patterns, so that all URIs in the RDF patterns have their full URI values (807). The next step is to generate queries on literal tables 623 and UriMap table 613 to convert the URIs and literals in the RDF pattern into their corresponding internal identifiers (809).

The next step is to generate a query on IdTriples 601 that produces a result table containing the rows of IdTriples 601 that satisfy each of the triples in the RDF pattern (810). For RDF pattern 507, the result table contains all of the rows having the ReviewerOf predicate, all of the rows having the predicate rdf:type and an object belonging to the class Student, and all of the rows having the predicate Age. The generated query that does this is shown at 823. Once the query for the result table has been generated, a self-join query can be generated on the result table which returns the set of rows from the result table for which the RDF pattern's variables match across the rows as specified in the RDF pattern (811). In the case of RDF pattern 507, the variable in question is the variable ?r, which represents the subject in each of the triples of pattern 507. The query that is generated for pattern 507 is shown at 827. At step 813, a limitation is added to the generated query that limits the rows to those belonging to the model specified in the invocation of RDF_MATCH. In the present case, that is the model specified in the invocation with 'reviewers'.

After the query on IdTriples 601 has been generated, queries are generated on UriMap table 613 and literal tables 623 to convert the internal identifiers in the self-join query results to their corresponding URI and literal values (815). Finally, the RDF rules that are specified in the invocation of RDF_MATCH are taken into account by replacing references to IdTriples table 601 in the generated query with subqueries or table functions that yield not only the triples explicitly specified in the RDF pattern, but also the triples which may be inferred by applying the rules to the explicitly specified triples (817). Rule processing is explained in more detail in the following. Once the query has been generated as just described, relational database management system 401 applies its optimizers to the query (818) and then executes the optimized query (819). The results are output in rows that have the columns that were determined at compile time.

Creating RDF Triple Tables 445 and RDF Rule Tables 449

As already described, RDF data sets are generally represented as text in text files and in many cases, the text files are written in a dialect of XML that has been developed for representing RDF data sets. The RDF data set contained in a text file may be added to RDF triples tables 445 and RDF rules tables 449 by any technique which reads the text file and converts its contents into records in RDF triples tables 445 and RDF rules table 449. In general, conversion works as follows:

- extract an RDF triple from the text representation of an RDF model.
- for each URI and literal in the triple, determine whether there is already a row in UriMap 613 for either the URI or the literal. If there is no row, a new row is made and the Internal ID field for that row is the internal ID for the URI or literal.
- When the internal ID for each component of the triple has been obtained from UriMap, make an entry for the triple in IdTriples table 601.

With rules, when a rule is encountered in a text file, the text strings specifying the rule are written to rule table 1709.

A preferred embodiment of the invention provides a function called RDF_GENMODEL which can be used in the invocation of RDF_MATCH to specify the RDF model. RDF_GENMODEL's signature looks like this:

```
RDF_GENMODEL (Webpages RDFWebpages)
RETURNS VARCHAR;
```

The parameter is the URI for a Web page that contains the XML representation of an RDF model. An invocation of RDF_MATCH that uses RDF_GENMODEL looks like this:

```
SELECT t.a age
FROM TABLE(RDF_MATCH(
    '(?r age ?a)'
    RDFModels(RDF_GENMODEL(<web_page_uri>)),
    NULL,
    NULL)) t
WHERE t.a < 25
```

When RDF_MATCH is invoked at query execution time, RDF_GENMODEL is executed. The function reads the XML representation of the RDF model contained in the web page and makes non-persistent versions of RDF triples tables 445 whose entries correspond to the triples in the Web page. RDF_MATCH then applies the invocation's RDF pattern to the tables made by RDF_GENMODEL.

Rule Processing

To handle rules, the RDF_MATCH function replaces references to IdTriples table 601 in the generated query with subqueries or table functions that yield not only the triples explicitly specified in the RDF pattern, but also the triples which may be inferred by applying the rules to the explicitly specified triples. Rule table 1709 is queried to determine what subqueries and/or table functions are necessary to obtain the inferred triples from IdTriples table 601 and the subqueries and/or table functions are applied to IdTriples table 601. Taking RDF pattern 312 and rule 301 as an example, there is a row in rule table 1709 for rule 301. When the RDF query specified in pattern 312 is executed on a model which includes the rulebase rb, rule table 1709 is queried for rules whose right hand side triple specifies a person who is a ReviewerOf a conference; if any are found, the left hand side of the triple is used as well as the first triple of pattern 301 to select people to whom the remaining triples of pattern 301 are to be applied.

Subqueries are used whenever the required inferencing can be done conveniently within a SQL query (i.e., without explicitly materializing intermediate results). The inferencing for rule 312 is done in that fashion. These subqueries generally take the form of a SQL UNION with one UNION component for each rule that yields a triple that selects entities inferred by the rule, plus one component to select the triples explicitly specified in the query. Table functions are used when the subquery approach is not feasible.

Processing RDFS Inference Rules

The RDFS inference rules require computation of transitive closures for the two transitive RDFS properties: rdfs:subClassOf (rule rdfs11) and rdfs:subPropertyOf (rule rdfs5). In Oracle RDBMS, these transitive closures can be computed using hierarchical queries with the START WITH and CONNECT BY NOCYCLE clauses. Note that CONNECT BY NOCYCLE queries can handle graphs that contain cycles. The remaining RDFS rules can be implemented with simple SQL queries.

To ensure that RDFS inferencing can be done within a single SQL query, the user is prohibited from extending the built-in RDFS vocabulary. This means, for example, that there cannot be a property that is a sub-property of the rdfs:subPropertyOf property, nor can there be a user-defined rule that yields rdfs:domain triples.

Processing User-Defined Rules

User-defined rules can be classified as follows based upon the extent of recursion, if any, in the rule:
  Non-recursive rules: The antecedents cannot be inferred by the given rule, or any rule that depends on the given rule's consequents.
  Simple recursive rules: These rules are used to associate transitivity and symmetry characteristics with user-defined properties.
  Rules that use arbitrary recursion unlike the other two categories.

Non-recursive user-defined rules can be evaluated using SQL (join) queries by formulating the FROM and WHERE clauses based upon the antecedents and the SELECT clause based on the consequents of the rule so as to return the inferred triples. Note that the triples that match the antecedents of a user-defined rule could themselves be inferred, so the FROM clause may reference subqueries to find inferred triples.

Simple recursive rules involving transitivity and symmetry can be evaluated as follows. Symmetry can be easily handled with a simple SQL query. However, handling transitivity with a single SQL query requires some type of hierarchical query (e.g., using the START WITH and CONNECT BY NOCYCLE clauses in Oracle RDBMS), as in the case of transitive RDFS rules.

The third class of rules involving arbitrary recursion is the most complicated, and it has not been addressed in the presently-preferred embodiment. Because an unknown number of passes over the intermediate results is required to find all inferred triples, these rules must be evaluated using table functions.

Optimizations of RDF_MATCH: FIGS. 10-16, 19-20

A number of optimizations of RDF_MATCH are possible. The optimizations fall into two categories:
  adding objects to RDF tables that increase the speed of execution of the queries specified in the RDF patterns and
  preprocessing RDF_MATCH to produce a set of declarative SQL strings that specify a query or queries that are equivalent to the query generated by RDF_MATCH and rewriting the containing query by replacing the TABLE construct and RDF_MATCH invocation with the SQL strings.

Optimization by preprocessing a table function and rewriting the containing query using the generated query can be applied to any table function for which a set of declarative SQL strings can be generated at compile time for the containing query that is completely equivalent to the query generated by the table function at runtime. The above is the case when nothing occurs during execution of the table function that will affect the form of the result rows returned by the table function.

Figure 10:
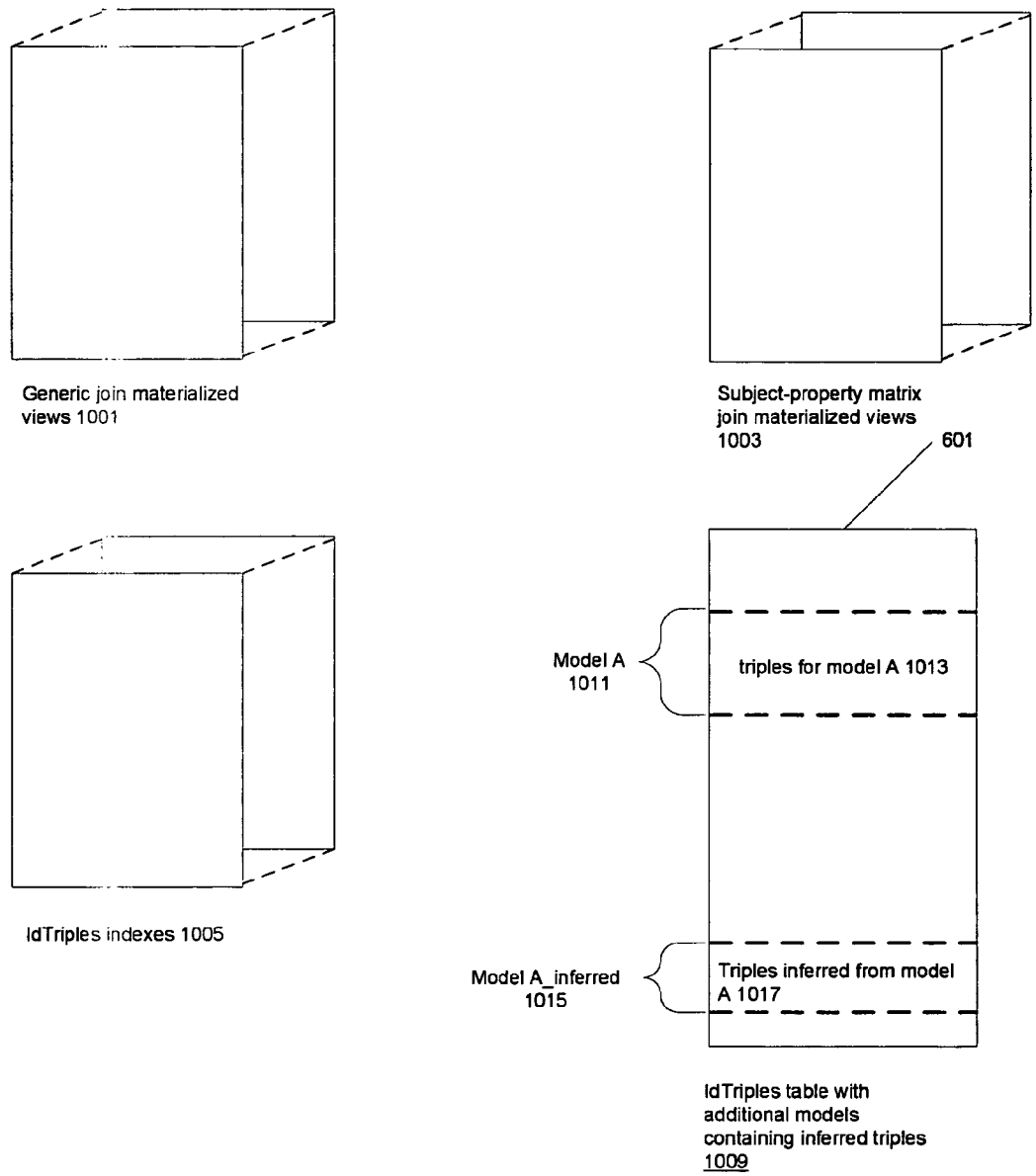
FIG. 10 is an illustration of RDF_MATCH optimization tables 447.

RDF Optimization Tables 447: FIG. 10

Among the ways in which RDF_MATCH can be optimized by adding tables to RDF optimization tables 447 are the following, shown at 1001:
  Generating materialized join views to reduce the join cost (1001);
  Generating subject-property matrix materialized views (1003);
  Generating indexes for the IdTriples table (1005); and
  Adding models with inferred triples to the IdTriples table (1009).

Materialized Views

A SQL query operates on one or more named tables to produce result rows. If the result rows are given names in the SQL query, then the query can operate on them in the same fashion as it can on any other table. The ultimate source of all the data in an SQL query is one or more base tables which are always present in DBS persistent storage 423. In the present context, the base tables are IdTriples 601 and UriMap 613. The named tables made from result rows are termed views of the base tables. For example, the query fragment 823 produces three views of the base table IdTriples: t1, which contains the rows of IdTriples whose PropertyID indicates the predicate Reviewers, t2, which contains the rows whose PropertyID indicates the predicate rdf:type and the ObjectID Student, and t3, which contains the rows whose PropertyID indicates the predicate Age. The relational database management system creates the views when the query is executed and removes them when they are no longer needed for the execution of the query. Creating the views takes a considerable amount of processing time, and consequently, the speed with which a query can be executed can be increased by the use of materialized views. A materialized view is simply a persistent view, that is, one that exists prior to the execution of the query and remains in existence after its execution. The costs of a materialized view are of course the extra persistent storage that it requires and the costs associated with keeping the data in the materialized view consistent with the data in the base tables it is a view of.

Note that the creation of materialized views does not complicate the logic of RDF_MATCH implementation. That is, the basic scheme of generating a self-join query as described above is still applicable. The only difference is that the RDBMS cost-based optimizer optimizes the generated self-join query by rewriting it to use materialized views where they are available and their use reduces the cost of the query in terms of I/O and CPU time.

Generic Materialized Join Views: FIGS. 9 and 19

If the same variable is used in more than one triple of the search pattern, the query generated by RDF_MATCH table function 435 involves a self-join of the IdTriples table, as may be seen from the FROM clause IdTriples t1, IdTriples t2, IdTriples t3 at 823. Depending on how many triples patterns are specified in the RDF pattern, a multi-way join needs to be executed. Since the join cost is a major portion of the total processing time, materialized join views can be defined to speed up RDF_MATCH processing. The row size of IdTriples table 601 is small and hence the trade off between the additional storage space required for materialized views and the extra processing speed they provide favors the use of materialized views. In general, six two-way joins may be defined on IdTriples table 601, namely joins between SubjectID-SubjectID, SubjectID-PropertyID, SubjectID-ObjectID, PropertyID-PropertyID, PropertyID-ObjectID, and ObjectID-ObjectID. Examples of some of these joins are shown at 901 in FIG. 9. In each case, a concrete example 903-913 of the join is given along with the number of rows in data triples table 203 which will be rows of the self-join:

Which of these six self joins is worth being treated as a materialized view depends on the kinds of RDF patterns that can be expected to occur in the RDF_MATCH function. Selection of the joins to be made into materialized views can thus be based on the workload characteristics. The most common joins are typically SubjectID-SubjectID, SubjectID-ObjectID, and ObjectID-ObjectID. Database management system 401 incrementally maintains the materialized join views to keep them current with IdTriples table 601 whenever they are used in a query.

The API for Generic Materialized Views: FIG. 19

FIG. 19 shows the API 1901 used to create and maintain generic materialized views. The first function in the API, RDFMViewCardinalities 1903, takes the name of an RDF model and optionally the name of an RDF rulebase as parameters. For the RDF model, the function analyzes the rows of RDF triples belonging to the RDF model in IdTriples 601s and the additional triples inferred by the rulebase specified in the rulebase parameter and generates cardinalities of materialized join views between Subject-Subject, Subject-Object, Subject-Property, Property-Property, Property-Object, and Object-Object so that a user can estimate the size of the join views to decide whether or not he/she wants to create the join views.

RDFMviewCreate function 1905 creates a generic materialized view based on the RDF models and optional rule bases specified in the second and third parameters. The materialized view will contain the model's triples and the triples inferred from the model using the rule bases. The first parameter is the name of the materialized view to be created. The fourth parameter specifies the join columns for the materialized view: SS indicates that the subject columns for the triples are the join columns; SO specifies the subject and object columns; SP the subject and predicate columns; PP the predicate columns, PO the predicate and object columns; and OO the object columns. RDFMViewDrop function 1907 deletes a named materialized view.

Subject-Predicate Matrix Materialized Views: FIGS. 11 and 19

RDF triples are extremely expressive in the sense that just about any fact can be expressed using an RDF triple. A table of RDF triples is, however, not ideal for efficient query processing. For example, data triples table 203 contains a separate row for each of a subject's predicate-object combinations. John, for instance, has rows for his age, for his membership in the class of Ph.D students, and his function as a reviewer for ICDE 2005. Because this is the case, obtaining all of the information about John from the table requires a three-way self join. Indeed, if John has n predicate-object combinations, retrieving all of the information about John from the table requires an n-way self join.

Query performance can be improved significantly by creating a subject-predicate matrix, that is, a materialized join view in which a row for a particular subject contains a number of different objects to which the particular subject is related. The objects may be either directly or indirectly related to the particular subject. Directly related objects are objects that belong to RDF triples that have the particular subject. Indirectly related objects are objects that belong to RDF triples whose subjects are objects in RDF triples which have the particular subject. There may of course be more than one level of such indirection. The columns of the subject-property matrix include a column for the subject and a column for each of the kinds of object related to the subject in the row. FIG. 11 shows at 1101 how a subject-predicate matrix 1105 may be made from a table of RDF triples 1103. The subjects of subject-predicate matrix 1105 are limited to Ph.D students. For such subjects, table 1105 has columns for the subject and columns for kinds of objects that are related to the students in table 1103, namely Age objects and StudiesAt objects. There is a row in subject-predicate table 1105 for each of the subjects in RDF triples table 1103 that belong to the class Ph.D student. In table 105, the Age objects are directly related to the subjects John and Pam and the StudiesAt objects are indirectly related to those subjects via the Univ1 and Univ2 objects and subjects in table 1103.

The subject-predicate matrix can be used to process RDF queries efficiently. For example, consider RDF pattern 1107, which retrieves the Age and EnrolledAt objects for each student belonging to the class Ph. D. Student and the City objects for the universities that are the Enrolled At objects. Absent materialized view 1105, this query will require a 4-way self-join on the IdTriples table (leaving out the conversion between Ids and URIs, for simplicity). However, by using the materialized view 1105, the query can be processed by simply selecting all the rows from the materialized view. Thus, self-joins can be completely eliminated in this case. This can lead to significant speed-up in query processing.

While subject-predicate matrix materialized views are particularly useful with tables of RDF triples, they may be used in any situation in which self joins are required to collect information about a number of attributes of a set of entities in a table. A query requiring an n-way self join to obtain the information about the attributes could potentially be processed using a matrix with columns for m-attributes using (n−m) joins. Such matrices are most efficient in their use of storage if each subject in the matrix has one or more objects for each of the chosen predicates. Some sparseness may be permitted to allow expanding the group of subjects to include subjects that may have no objects for a few of the predicates that have columns in the matrix. It may be noted that as with materialized views generally, the performance gains from the use of such matrices must be traded off against the extra space required.

The API for making a subject-property materialized view is shown at 1909 in FIG. 19. The function takes five parameters: a name for the new materialized view, the RDF model or models to which it is to apply, the rulebase or rulebases from which RDF triples may be inferred from the model, an RDF pattern 205 whose predicates are to be columns in the materialized view, and a filter for the table's rows.

Indexing IdTriples Table 601: FIGS. 12 and 13

A common way of speeding up access to information in an RDBMS table is to provide an index for the table. Indexes on tables work exactly the same way as indexes in books. An index entry in a book has a word or phrase followed by a list of the numbers of the pages in the book on which the word or phrase occurs. The index in the book speeds access by permitting the reader to go directly to the page or pages of interest. Conceptually, an index entry for an RDBMS table consists of a value from a row of the table followed by a row number for the row that contains the value. The value may be made by concatenating several fields of the row. The index on the table speeds access to the table by permitting the RDBMS to go directly to the indexed row or rows. RDBMS systems typically provide built-in facilities for creating a number of different kinds of indexes. The kind of indexes used in the preferred embodiment are the B tree indexes provided by the Oracle database system in which the preferred embodiment is implemented.

As was the case with materialized views, the RDBMS's optimizer automatically determines whether there are indexes to a table being queried and if so, whether using one of the index will reduce the processing time required for the query in question. An important metric used by the optimizer is selectivity. Selectivity refers to the percentage of rows in a table that are returned by a query. A query is considered highly selective if it returns a very limited number of rows. A query is considered to have low selectivity if it returns a high percentage of rows. The more selective a query is, the greater the cost savings from using an index.

FIG. 12 shows at 1201 data triples table 203 in which each row has been assigned a row number 1203. Index 1205 is an index for data triples table 203 which indexes the table according to values from each row that are made by concatenating table 203's Predicate, Subject, and Object fields in the row. Conceptually, index 1205 may be seen as a table with a Predicate column 1207, a Subject column 1209, an Object column 1211, and a Rownum column 1213. Each row 1215 of index 1205 is an index entry. The entry 1215 contains the values of the Predicate, Subject, and Object fields of a single row of data triples table 203 and the value of RowNum in entry 1215 is the row number of the single row in table 203. Of course, in some cases, there may be more than one row of the indexed table that corresponds to an index entry 1215, and in that case, there will be a list of row numbers at 1213. In index 1205, the index entry includes values from the Predicate, Subject, and Object fields in that order, and in the terminology used in the following, index 1205 is a (predicate, subject, object) index.

As mentioned earlier, most of the work involved in executing the query generated by RDF_MATCH is performing self joins on IdTriples table 601. Since the self joins involve repeatedly referencing the rows of IdTriples table 601, having indexes that are adapted to the kinds of queries generated by RDF_MATCH is critical for the performance of RDF_ MATCH. In the following, the self-join queries generated by RDF_MATCH are analyzed to determine which columns of IdTriples table 601 should be indexed for optimal query performance. The analysis is performed using the information 1301 in FIG. 13. There are typically two types of RDF patterns:

1. those in which, for a given predicate, subject is joined with subject, or object with object, as shown in RDF pattern 1303, which joins rows whose subjects belong to the domain of the ReviewerOf predicate with rows whose subjects belong to the domain of the Age predicate.
2. those in which for a given predicate, subject is joined with object, as shown at 1305, in which joins rows whose objects belong to the range of the ReviewerOf predicate with rows whose subjects belong to the domain of the rdf:type predicate.

The same query patterns can be observed as more triples are added.

Since IdTriples 601 only has three columns, only the following five kinds of indexes for predicates can be built on the table:

1. (PropertyID),
2. (PropertyID, SubjectID),
3. (PropertyID, SubjectID, ObjectID).
4. (PropertyID, ObjectID)
5. (PropertyID, ObjectID, SubjectID)

Index (1) above will be termed in the following a single-column index; indexes (2) and (4) will be termed two-column indexes; indexes (3) and (5) will be termed three-column indexes. With queries that returns less than 20% of the records in IdTriples 601, and are therefore highly selective, indexes such as (3) and (5) above, which use the values of all three columns in a row's index entry, have been found to be most efficient.

Optimizing Inferencing: FIGS. 7 and 10

Rulebases specified in the RDF_MATCH table function's parameters are applied, by default, during query processing to the specified list of RDF models. However, if a rulebase is used frequently, then a new model containing the RDF triples inferred from one or more rule bases can be added to IdTriples table 601. The new model can then be used to speed up query execution. This is shown at 1009 in FIG. 10, where model A 1011 in IdTriples table 601 has triples 1013. To optimize execution of RDF queries on model A, a new model A_inferred 1015 has been added to IdTriples table 601. The new model 1015 includes the triples 1017 that have been inferred by the application of one or more rulebases to triples 1013 of model A. To take advantage of A_inferred model 1015, the Models parameter for the invocation of the RDF_MATCH table function includes both model A 1011 and model A_inferred 1015 but the RuleBases parameter does not include the rulebase or rulebases that were used to produce A_inferred 1015. When this is done, RDF_MATCH simply uses the triples in the models A and A_inferred rather than using the rulebases to infer the inferred triples from model A.

In other embodiments, inclusion of a set of inferred triples may be transparent to the user. In such an embodiment, the inferred triples can be stored in a separate table in which they are related to the model the triples are inferred from and the rulebase used to infer them. When an invocation of RDF_ MATCH specifies a rulebase, the code for the function checks whether there are inferred triples for the model and rulebase specified in the invocation, and if there are, the code does not again infer the triples, but instead joins the inferred triples from the rows for the model and rulebase in the inferred triples table to the triples from the model.

FIG. 7 shows the API used to add models with inferred rules to IdTriples table 601. The API used to add a model with inferred rules is shown at 711; it takes as parameters the model to which the rulebase is to be applied, the rulebase, and a name for the new model that will contain the triples inferred by applying the rules specified by the rule base to the specified model. The result of executing CreateRulesIndex is that a model 1015 will be added to IdTriples table 601 that has the name indicated in the last parameter and the additional triples that are inferred by applying the rule base of the second parameter to the model specified in the first parameter. The API used to drop a model containing inferred rules is shown at 713; the only parameter is the name of the index to be dropped.

Figure 14:
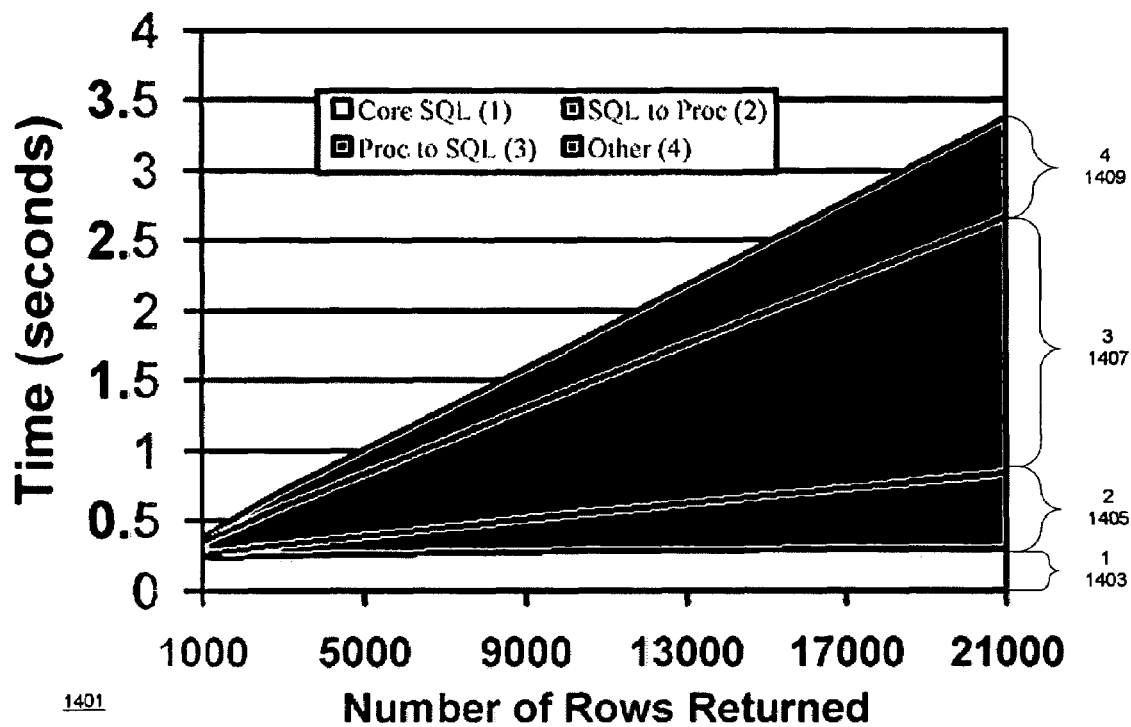
FIG. 14 shows how rewriting the contained query can improve efficiency.
Figure 16:
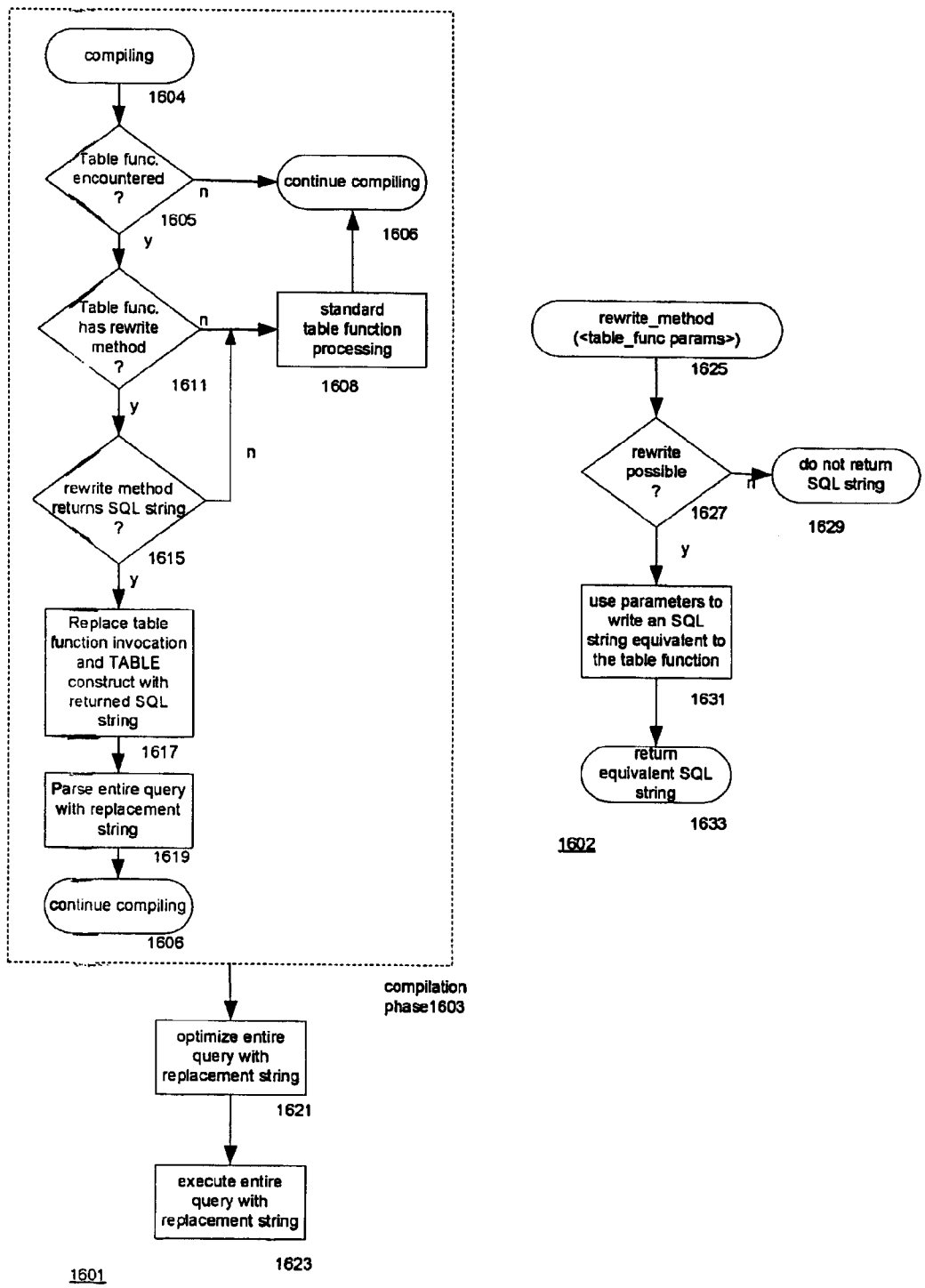
FIG. 16 is a flowchart of optimization by rewriting.

Eliminating the Overhead of the Table Function: FIGS. 14-16

The SQL table function mechanism is a general purpose mechanism for converting data that is accessible to the table function into rows. The mechanism works not only with table functions that obtain their data from existing relational tables, as is the case with RDF_MATCH, but also with table functions that read their data from files, fetch the data across the World Wide Web, or even receive feeds of data such as stock price information. One consequence of the generality of the table function mechanism is substantial overhead. For example, the time $t_{total}$ required for processing an RDF pattern using RDF_MATCH table function 435 has the following components:

$$t_{total} = t_{core} + t_{sql2proc} + t_{proc2canonical} + t_{canonical2sql}$$

Here $t_{core}$ represents the core processing time, that is, the cost of executing the SQL query that is generated by RDF_MATCH and performs the self-joins on IdTriples table 601 and any additional joins on UriMap table 613. Once the result rows of the generated query have been computed, the table function mechanism copies the rows into variables of RDF_MATCH ($t_{sql2proc}$) and then converts the values of these variables to a canonical format ($t_{proc2canonical}$) for the table function mechanism so that the mechanism can return the values to the containing query. When the mechanism returns the values in the canonical format to the containing query, it transforms them back into rows ($t_{canonical2sql}$).

The processing time represented by $t_{total}-t_{core}$ depends on the size of the result set returned by the table function to the table function mechanism and hence $t_{total}-t_{core}$ will dominate the cost of executing the table function when the table function result set size is large. This is shown in graph 1401 in FIG. 14. Graph 1401 shows how $t_{total}$ in seconds for RDF_MATCH increases with the number of result rows returned by the query generated by RDF_MATCH. Graph 1401 further shows how $t_{core}$ 1403, $t_{sql2proc}$ 1405, $t_{proc2canonical}$ and $t_{canonical2sql}$ 1407, and other 1409 make up $t_{total}$.

As is apparent from graph 1401, eliminating the conversion overhead of $t_{sql2proc}$, $t_{proc2canonical}$ and $t_{canonical2sql}$ would enormously reduce the amount of time required to execute RDF_MATCH where RDF_MATCH returns a significant number of rows. That it should be possible to eliminate the conversion overhead can be seen from the fact that with RDF_MATCH, the conversions are performed on result rows from relational database tables, that is, on data that is already in the form required for the containing query. What the conversions do is convert result rows returned by the generated query to values of variables in RDF_MATCH, convert the variable values to the table function mechanism's canonical form, and then convert the values in the canonical form back into result rows that have the same form as the ones returned by the generated query.

In the case of table functions like RDF_MATCH, in which the table function obtains its data by means of a query on a set of relational tables, the conversion overhead can be eliminated by rewriting the query containing the table function such that the query used by the table function to obtain the data replaces the table function in the containing query. This is shown in FIG. 15. At 1501 is shown a query that employs the table function RDF_MATCH (1503). The RDF pattern used in the table function is shown at 1505. At 1507 is shown the query which RDF_MATCH generates from RDF pattern 1505; at 1509 is shown rewritten query 1501 in which table function 1503 has been replaced by generated query 1507.

The query rewrite of FIG. 15 can of course always be done by hand; however, the table function mechanism can be modified to rewrite the query containing the table function, and consequently, a version of the table function mechanism can be created which does the following:

given a table function, use the table function to generate a query;

return the query generated by the table function;

rewrite the containing query so that the generated query replaces the TABLE construct and the table function invocation in the containing query;

reparse the rewritten containing query; and execute the rewritten containing query.

In the following, this new version of the table function mechanism will be termed the table function rewrite version. The table function rewrite version may be used in any situation where the rows returned by the table function may be declaratively defined, as is the case where they can be defined by an SQL query.

In a preferred embodiment, the table function rewrite version of the table function mechanism is implemented by adding an ODCITableRewrite method to the definition of the table function. The method defines how the table functions parameters are to be used to generate an SQL query that can replace the TABLE construct and the table function in the containing SELECT statement. When the containing query is being compiled by the SQL compiler, the compiler executes the ODCITableRewrite method to obtain an SQL query that is equivalent to the table function. The compiler then replaces the TABLE construct and the RDF_MATCH invocation with the SQL query. At 1415 is shown an example of a query with RDF_MATCH invocation 1503. The rewritten query which results is shown at 1419. In query 1419, the TABLE construct and the invocation of RDF_MATCH have been replaced by query 1507 generated by the ODCITableRewrite method.

In addition to using the ODCITableRewrite method to generate the query required to rewrite the containing query, the table function rewrite version of the table function mechanism must perform additional type checking to ensure that the columns referenced in the containing query are indeed returned from the generated SQL query as well as to ensure that the data types for columns referenced in the outer query are compatible with the source datatypes in the generated SQL query. The additional type checking overhead required is, however, small, and unlike the conversion overhead of the present table function mechanism, does not increase with the size of the result set returned by the table function. The exact mechanism used to obtain the SQL string is of course immaterial; it may be, as above, a method associated with the table function or it may be a function that takes the table function as a parameter.

FIG. 16 is a flowchart 1601 of how the table function rewrite version of the table function mechanism operates in a preferred embodiment. The processing is done during the compilation phase 1603 of SQL query processing. At 1604, compilation continues until the compilation is finished (1606). If a table function is encountered (1605), the compiler first determines whether the table function has a rewrite method (1611). If it does not, the table function is processed in the usual manner (1608) and compilation continues (1606) If the table function does have a rewrite method, the rewrite method is executed (1615). If the result of the execution is not an SQL string, the table function is processed in the usual manner and compilation continues (1608, 1606). If the result is an SQL string, the compiler replaces the table function invocation and the TABLE construct with the returned SQL string (1617). The compilation phase then reparses the rewritten query (1619). Compilation of the containing query then continues until it is finished.

Then the optimization stage of query generation is entered and optimization is done on the containing query as rewritten. As important advantage of rewriting the containing query with SQL that is equivalent to the table function is that the equivalent SQL is available to the optimizer. With standard table functions, the optimizer can optimize the queries generated by the table function and can optimize the containing query, but when the optimizer is optimizing the containing query, it must treat the table function as a "black box" and cannot take the queries generated by the table function into account. Once optimization is done, the containing query is executed with the replacement string. Here, because the table function has been eliminated, there is no need to perform the conversions that accompany the invocation of and return from the execution of the table function. At 1602 is shown a flowchart of the rewrite method. At 1625, the rewrite method is invoked by the compiler using the parameters from the table function. At 1627, the rewrite method determines whether the parameter values permit a rewrite. If they do not, the method does not return an SQL string (1629). If the parameter values do permit a rewrite, the rewrite method uses the parameters to write an SQL string that is equivalent to the table function (1631) and then returns the equivalent SQL string to the compiler. It is thus up to the writer of the rewrite method to determine when it is possible to write an SQL string that is equivalent to the table function.

How the SQL string is written in step 1631 of course depends on the parameters and the tables the query is written over. In the case of RDF_MATCH, generating the SQL string involves substantially the same steps as generating the query when RDF_MATCH is executed. These steps are shown at 805 in FIG. 8. The difference between FIG. 8 and the processing shown in FIG. 16, of course, is that in FIG. 8, the SQL string for the query is generated at runtime and is executed inside the execution of RDF_MATCH; in FIG. 16, the SQL string for the query is generated at compile time and replaces the execution of RDF_MATCH. Because the SQL string replaces the execution of RDF_MATCH, the run time overhead resulting from the execution of the table function is eliminated. Included in the eliminated overhead are copying the results for the select list items of the containing SQL query to the respective attributes of the table function return object instance, passing the resulting object instance via the table function infrastructure, and remapping the passed object instance to the selected list items.

Other Examples of the Use of ODCITableRewrite: FIG. 20

FIG. 20 contains other examples of the use of ODCITableRewrite. At 2001 is shown how ODCITableRewrite may be used to replace an invocation of the table function tab_func with an SQL string. The original query with the invocation of tab_func is shown at 2003; the query that is generated when tab_func is executed is shown at 2005; the original query with the TABLE construct and the invocation of tab_func replaced by query string 2005 is shown at 2007.

Table functions may be used with SQL constructs other than the TABLE construct. The TABLE construct and other such constructs will be termed in the following table function containers. The effect in the TABLE construct and elsewhere is to parameterize the table function container, i.e., what result rows are returned by the table function container is determined by the parameters used in the table function. At 2009 in FIG. 20 is shown how a parameterized view may be used as a table function container. The parameterized view is called summaries. It returns a summary for a given period of time from a given table, with the given table and given period of time being determined by the parameterized view's parameters. The SQL-DDL for creating the parameterized view is shown at 2011. USING clause 2013 specifies how the result rows specified by the view will be obtained; in this case they are obtained by executing the table function sum_tab_function 2012; the parameter fact_table specifies a table from which the summary is going to be made and the parameter time_granularity specifies the period of time. At 2015 is shown a SELECT statement that obtains its result rows from the parameterized view summaries 2016. The parameters 2014 in summaries are the parameters required for sum_tab_function 2012. Here, the table is a table of sales and the time period is a year.

If the table function has a rewrite method, the summaries parameterized view may be replaced by an SQL string generated by the rewrite method in the same fashion that the TABLE construct is replaced in the first example. The SQL string generated by the rewrite method for sum_tab_function 2012 is shown at 2017; and 2019 is shown the SELECT statement of 2015 in which parameterized view 2016 has been replaced by string 2017.

CONCLUSION

The foregoing Detailed Description has disclosed to those skilled in the relevant technologies how the overhead involved in the execution of a table function may be reduced by generating an SQL string that returns a set of result rows equivalent to the set of result rows returned by the table function and rewriting the SQL query that contains the table function such that the SQL string replaces the container for the table function. Rewriting the SQL query in this fashion also makes it possible to apply the relational database system's optimizer to the rewritten SQL query. The Detailed Description has further disclosed the best mode presently known to the inventors of implementing their rewrite technique.

In the foregoing Detailed Description, the rewrite technique is applied to a TABLE function that is used to integrate RDF data into a relational database system, but those skilled in the relevant technologies will immediately appreciate that the technique can be used with many TABLE functions. The preferred embodiment of the technique is of course determined by the fact that the TABLE function with which it is used performs queries on RDF data and by the fact that the table function mechanism of the preferred embodiment is that provided for the relational database system in which the preferred embodiment is implemented. As is always the case with software-implemented inventions, there is also the latitude which software affords the implementer for his implementation. For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A relational database management system of the type wherein a table function returns a set of result rows which are represented in an SQL statement by a container for the table function, the relational database management system executing on a processor that has access to a storage device and
the relational database management system having the improvement comprising:
a rewrite method in the storage device, the rewrite method being associated with the table function returning an SQL string which does not include the table function and which when executed will return a set of result rows which is equivalent to the set of result rows returned by the table function,
the relational database system executing the rewrite method prior to executing the container to obtain the SQL string and thereupon rewriting the SQL statement such that the container for the table function is replaced by the returned SQL string.

2. The relational database management system set forth in claim 1 wherein:
the table function has a parameter; and
the rewrite method uses the parameter in producing the returned SQL string.

3. The relational database management system set forth in claim 2 wherein:
the rewrite method determines from the parameter whether it is possible to produce the SQL string and provides an indication when it is not possible; and
the relational database management system responds to the indication by not rewriting the SQL statement.

4. The relational database management system set forth in claim 1 wherein:
the rewrite method determines whether it is possible to produce the SQL string and provides an indication when it is not possible; and
the relational database system responds to the indication by not rewriting the SQL statement.

5. The relational database management system set forth in claim 4 further comprising:
a runtime execution method that is associated with the table function, the relational database management system executing the runtime execution method when the container is executed if the rewrite method has determined that it is not possible to produce the SQL string.

6. The relational database management system set forth in claim 1 further comprising:
a runtime execution method that is associated with the table function, the rewrite method being optional and the relational database management system executing the runtime execution method when the container is executed if the rewrite method is not present.

7. The relational database management system set forth in claim 1 wherein:
the relational database system further optimizes the rewritten SQL statement.

8. The relational database management system set forth in claim 1 wherein:
the rewrite method is optional; and
if there is no rewrite method, the relational database system does not rewrite the SQL statement.

9. The relational database management system set forth in claim 1 wherein:
the table function and the rewrite method are provided by the relational database management system.

10. The relational database management system set forth in claim 1 wherein:
the table function and the rewrite method are provided by a user of the relational database management system.

11. The relational database management system set forth in claim 1 wherein:
the container is a TABLE clause.

12. The relational database management system set forth in claim 1 wherein:
the container is a parameterized view that is defined using the table function.

13. A storage device that is accessible to a processor, the storage device being characterized in that:
the storage device contains code which, when executed by the processor, implements a relational database management system of the type wherein a table function returns a set of result rows which are represented in an SQL statement by a container for the table function,
the relational database management system having the improvement comprising:
a rewrite method, the rewrite method being associated with the table function and returning an SQL string which does not include the table function and which when executed will return a set of result rows which is equivalent to the set of result rows returned by the table function,
the relational database system executing the rewrite method prior to executing the container to obtain the SQL string and thereupon rewriting the SQL statement such that the container for the table function is replaced by the returned SQL string.

14. A method executed by a relational database management system of the type wherein a table function returns a set of result rows which are represented in an SQL statement by a container for the table function, the relational database management system executing on a processor that has access to a storage device and
the method comprising the steps of:
receiving the SQL statement;
making an SQL string which does not include the table function and which, when executed, will return a set of result rows which is equivalent to the set of result rows returned by the container function; and
rewriting the SQL statement such that the container is replaced with the SQL string prior to executing the SQL statement.

15. The method set forth in claim 14 wherein:
the table function has a parameter; and
the parameter is used in the step of making the SQL string.

16. The method set forth in claim 15 wherein
the parameter is used in the step of making the SQL string to determine whether it is possible to make the SQL string and
the method further comprises the steps of:
providing an indication when it is not possible to produce the SQL string; and
responding to the indication by not performing the step of rewriting the SQL statement.

17. The method set forth in claim 14 wherein the method further comprises the steps of:
providing an indication when it is not possible to produce the SQL string; and responding to the indication by not performing the step of rewriting the SQL statement.

18. The method set forth in claim 17 further comprising the step of:
   executing the table function when the SQL statement is executed.

19. The method set forth in claim 14 wherein
the step of making the SQL string is optional and
the method further comprises the step performed when the step of making the SQL string is not performed of:
   executing the table function when the SQL statement is executed.

20. The method set forth in claim 14 further comprising the step of:
   optimizing the SQL statement after the SQL statement has been rewritten.

21. The method set forth in claim 14 wherein:
the step of making the SQL string is optional; and
if the step of making the SQL string is not performed, the step of rewriting the SQL statement is also not performed.

22. The method set forth in claim 14 wherein:
in the step of receiving the SQL statement, the container is a TABLE clause.

23. The method set forth in claim 14 wherein:
in the step of receiving the SQL statement, the container is a parameterized view that is defined using the table function.

24. A storage device that is accessible to a processor, the storage device being characterized in that:
   the storage device contains code which, when executed by the processor, implements a method executed by a relational database management system of the type wherein a table function returns a set of result rows which are represented in an SQL statement by a container for the table function,
the method comprising the steps of:
   receiving the SQL statement;
   making an SQL string which does not include the table function and which t, when executed, will return a set of result rows which is equivalent to the set of result rows returned by the container function; and
   rewriting the SQL statement such that the container is replaced with the SQL string prior to executing the SQL statement.

\* \* \* \* \*